(12) United States Patent
Choi et al.

(10) Patent No.: US 11,445,453 B2
(45) Date of Patent: Sep. 13, 2022

(54) METHOD AND APPARATUS FOR CONTROLLING POWER OF DEVICE BY USING BLUETOOTH TECHNOLOGY

(71) Applicant: LG ELECTRONICS INC., Seoul (KR)

(72) Inventors: Jingu Choi, Seoul (KR); Taeyoung Song, Seoul (KR); Minsoo Lee, Seoul (KR); Jinkwon Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 26 days.

(21) Appl. No.: 16/972,905

(22) PCT Filed: Jun. 7, 2019

(86) PCT No.: PCT/KR2019/006908
§ 371 (c)(1),
(2) Date: Dec. 7, 2020

(87) PCT Pub. No.: WO2019/235892
PCT Pub. Date: Dec. 12, 2019

(65) Prior Publication Data
US 2021/0250879 A1   Aug. 12, 2021

(30) Foreign Application Priority Data
Jun. 7, 2018   (KR) .................. 10-2018-0065352

(51) Int. Cl.
*H04W 52/10* (2009.01)
*H04W 52/38* (2009.01)
(Continued)

(52) U.S. Cl.
CPC .......... *H04W 52/383* (2013.01); *H04W 4/80* (2018.02); *H04W 52/242* (2013.01); *H04W 52/245* (2013.01); *H04W 52/367* (2013.01)

(58) Field of Classification Search
CPC ..... H04W 52/10; H04B 17/318; H04H 20/08; H03L 5/00
See application file for complete search history.

(56) References Cited

U.S. PATENT DOCUMENTS

2016/0174058 A1* 6/2016 Lindholm ............... H04W 4/80
370/329

FOREIGN PATENT DOCUMENTS

JP      2017108222    6/2017
KR   1020110030453   3/2011
(Continued)

*Primary Examiner* — Tu X Nguyen
(74) *Attorney, Agent, or Firm* — Dentons US LLP

(57) ABSTRACT

The present disclosure relates to a method and apparatus for controlling a power by using the Bluetooth Low Energy technology performed by a control device. According to the present disclosure, the method and apparatus includes establishing a connection with a first device and a second device through Bluetooth Low Energy (BLE) and receiving, from the first device, a first request message for requesting a transmission power change of the first device.

In addition, the method and apparatus includes receiving, from the second device, a second request message for requesting a transmission power change of the second device and changing a transmission power of the control device to a specific transmission power value based on the first change value and the second change value.

10 Claims, 19 Drawing Sheets

(51) Int. Cl.
*H04W 4/80* (2018.01)
*H04W 52/24* (2009.01)
*H04W 52/36* (2009.01)

(56) References Cited

FOREIGN PATENT DOCUMENTS

| KR | 1020140115898 | 10/2014 |
|----|---------------|---------|
| WO | 2016159678 | 10/2016 |
| WO | 2018009040 | 1/2018 |

\* cited by examiner

[Fig.1]
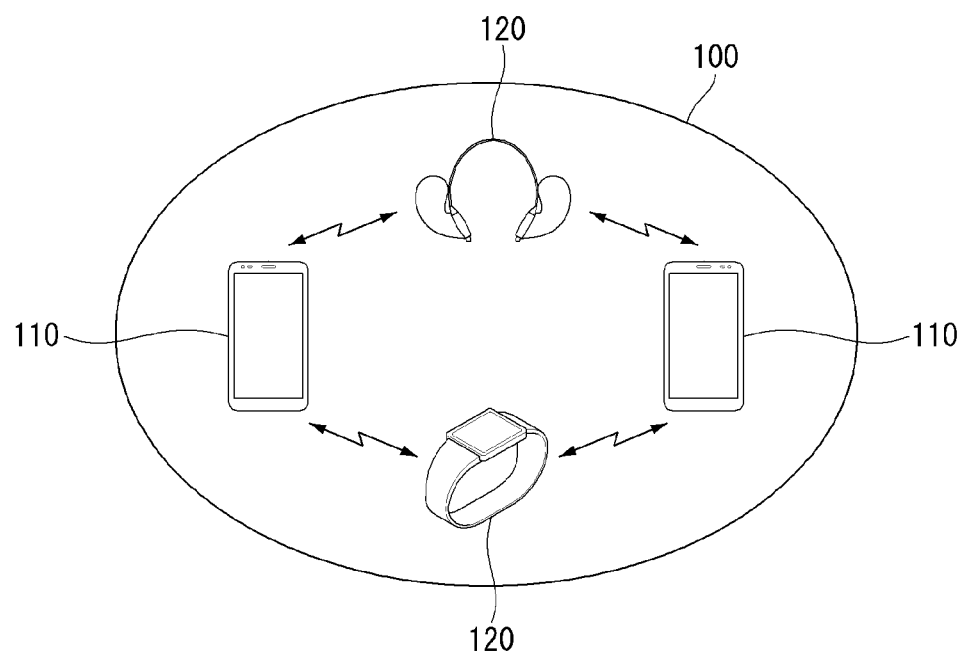

[Fig.2]
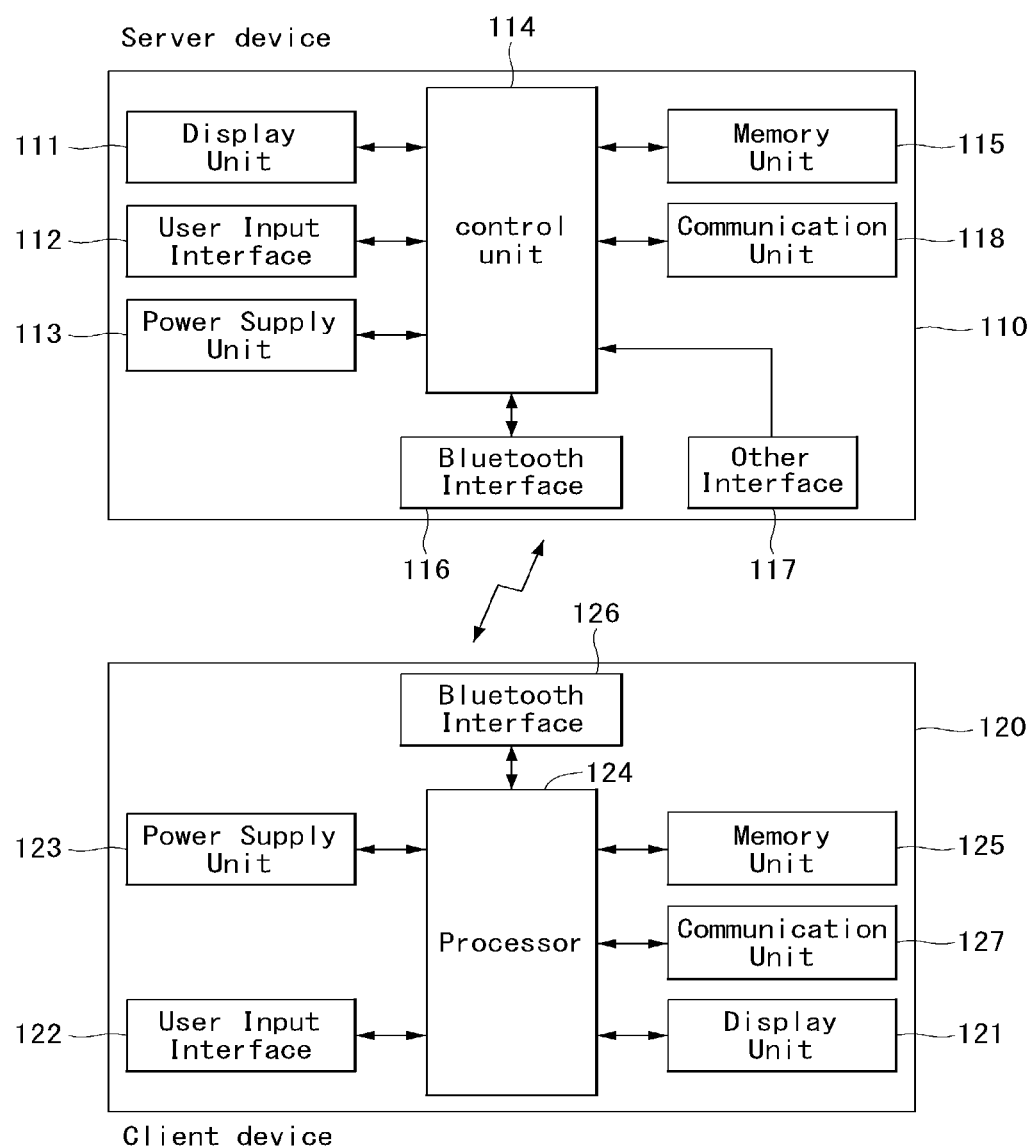

[Fig.3]
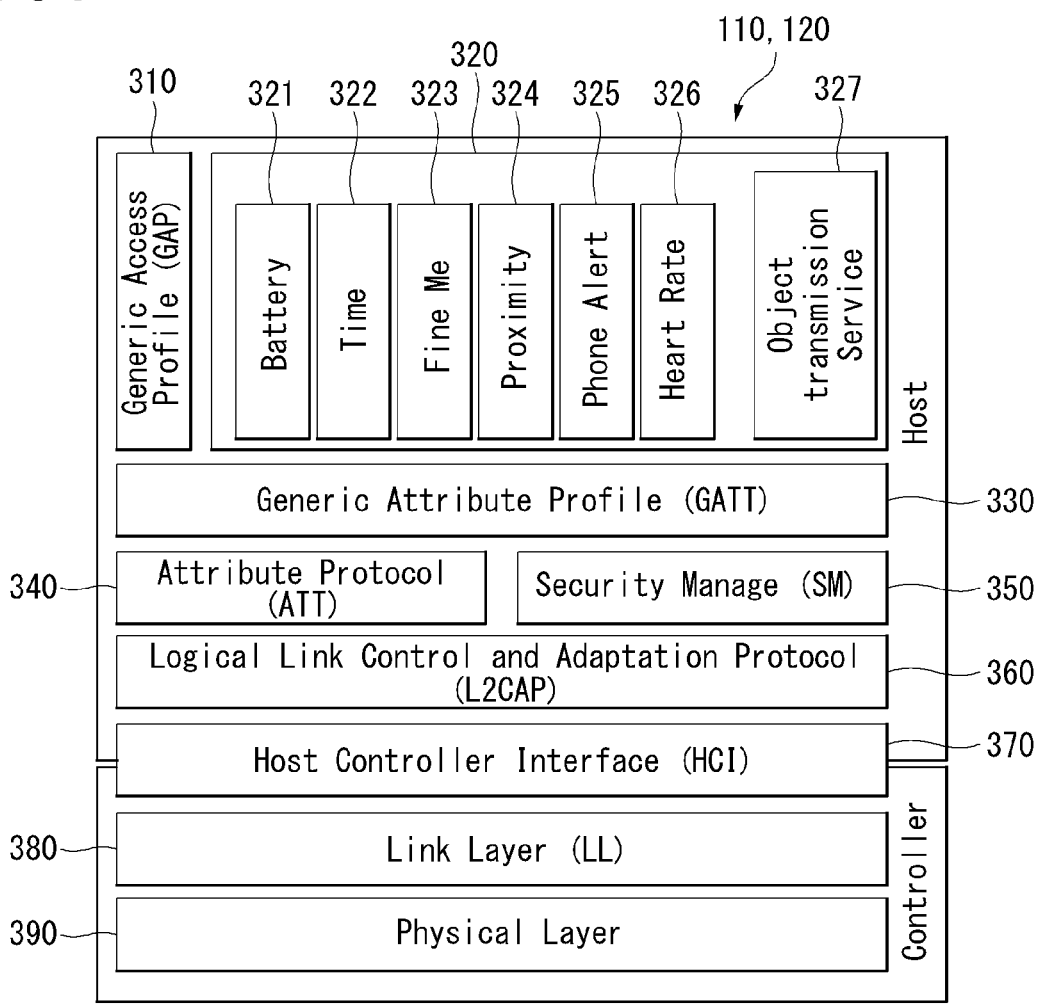

[Fig.4]
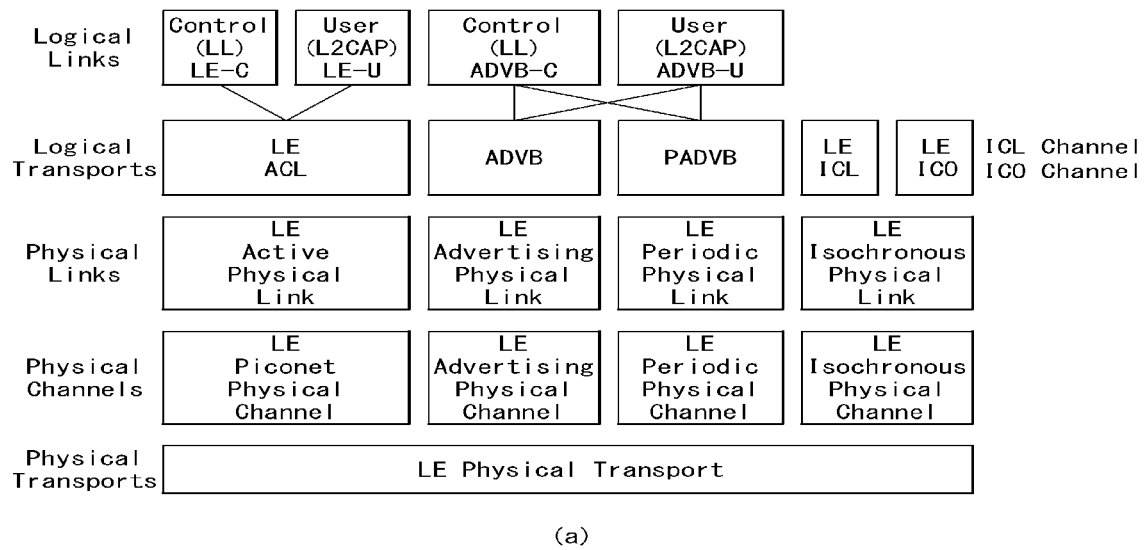
(a)
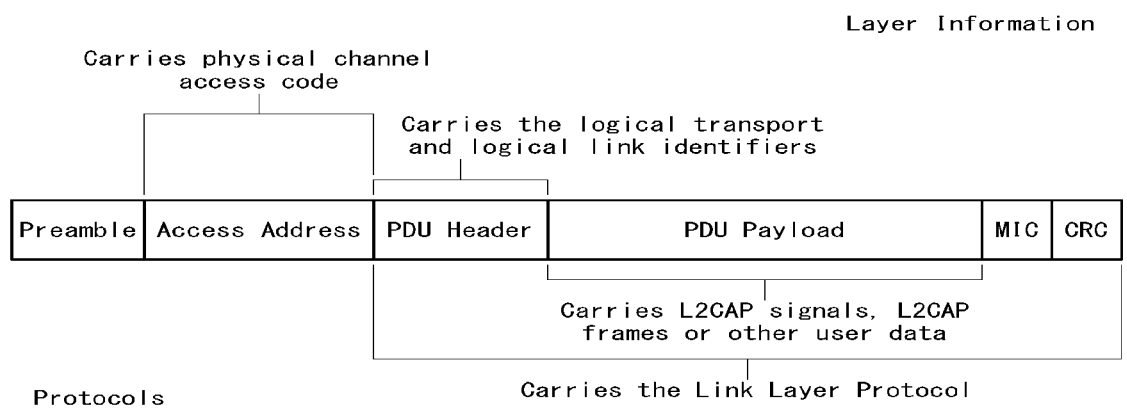
(b)

[Fig.5]
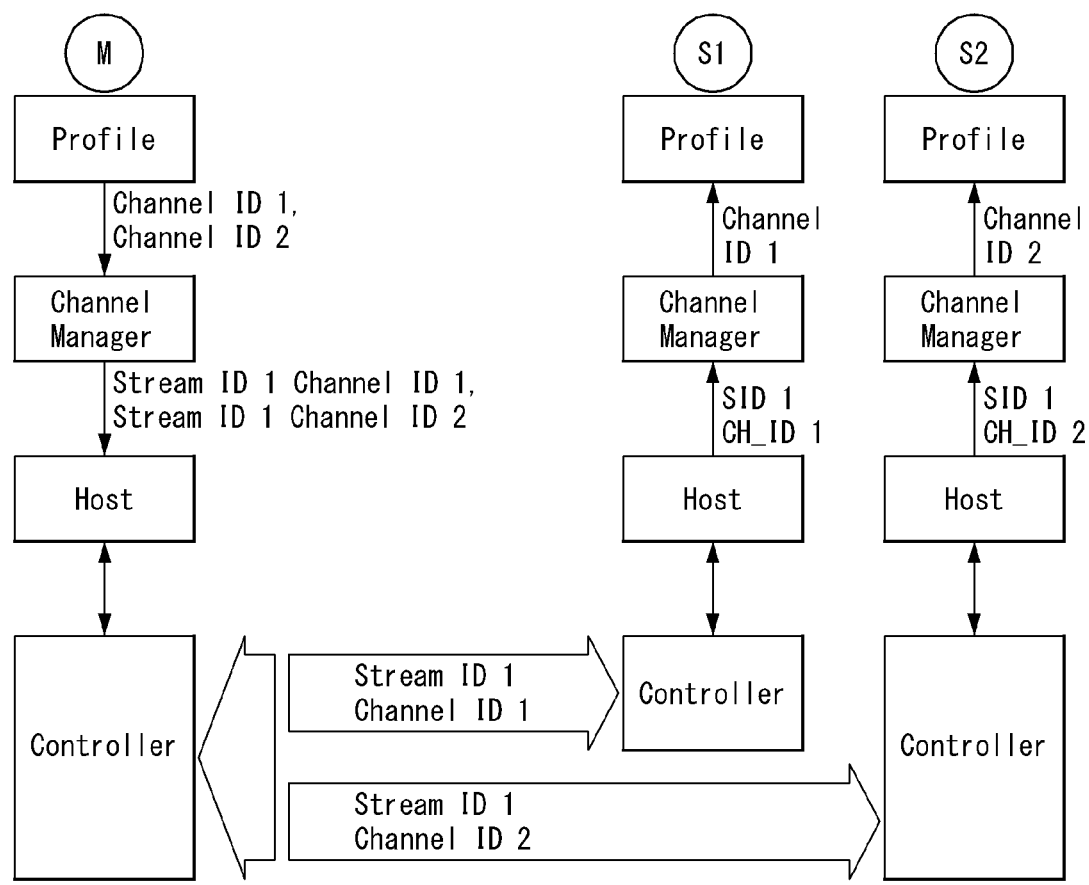

[Fig.6]
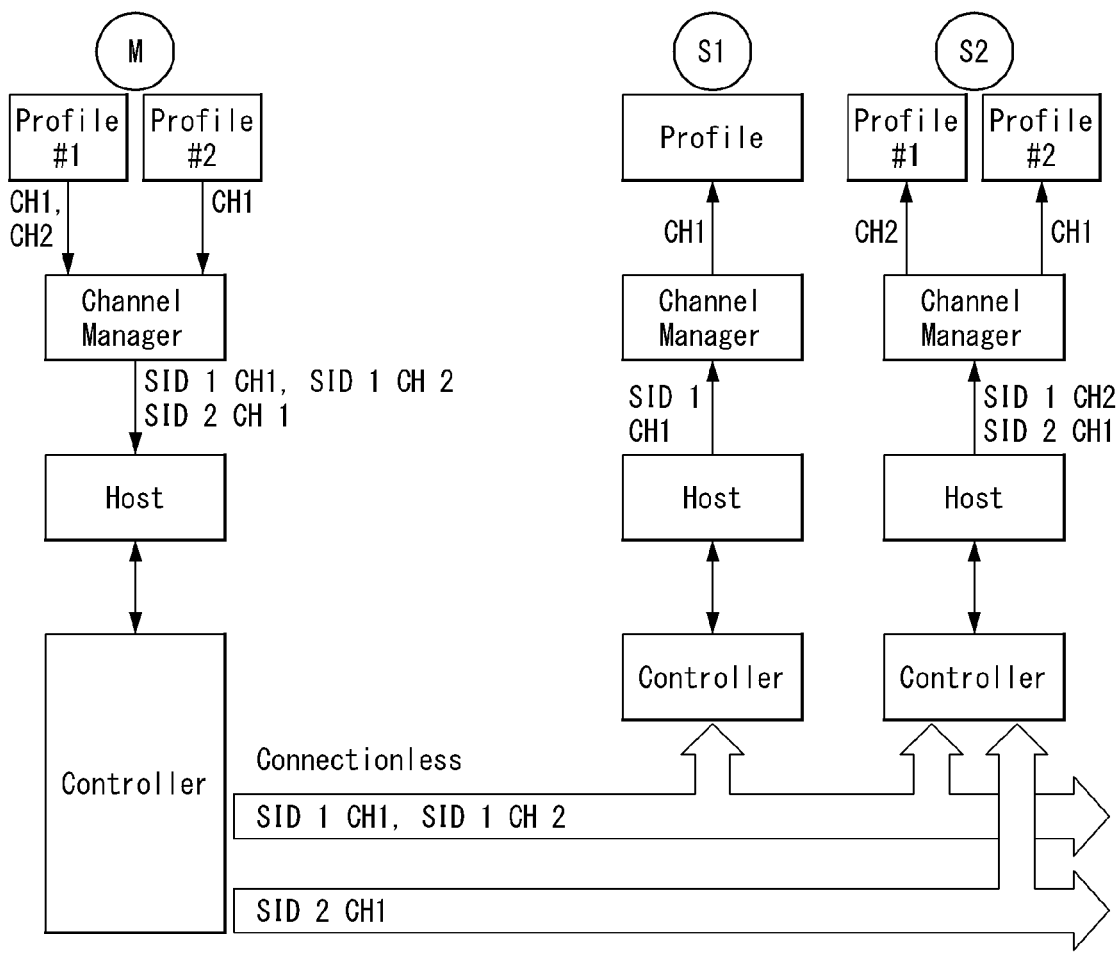

[Fig.7]
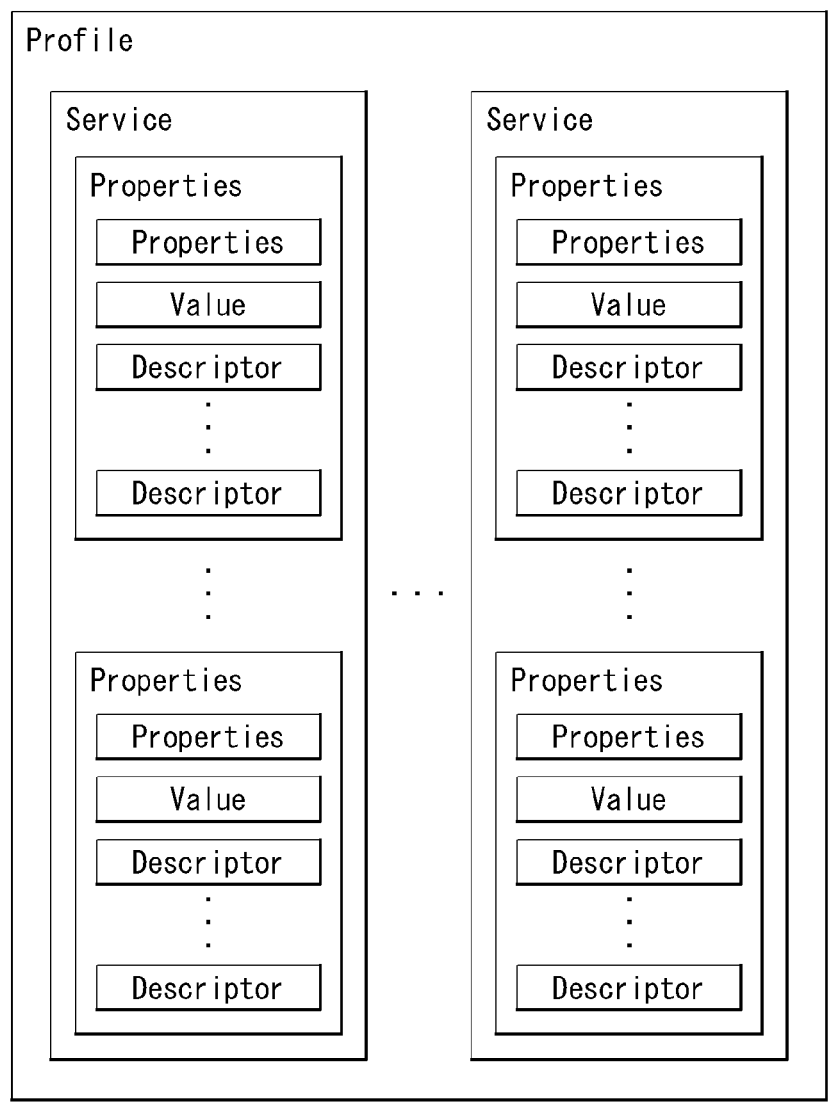

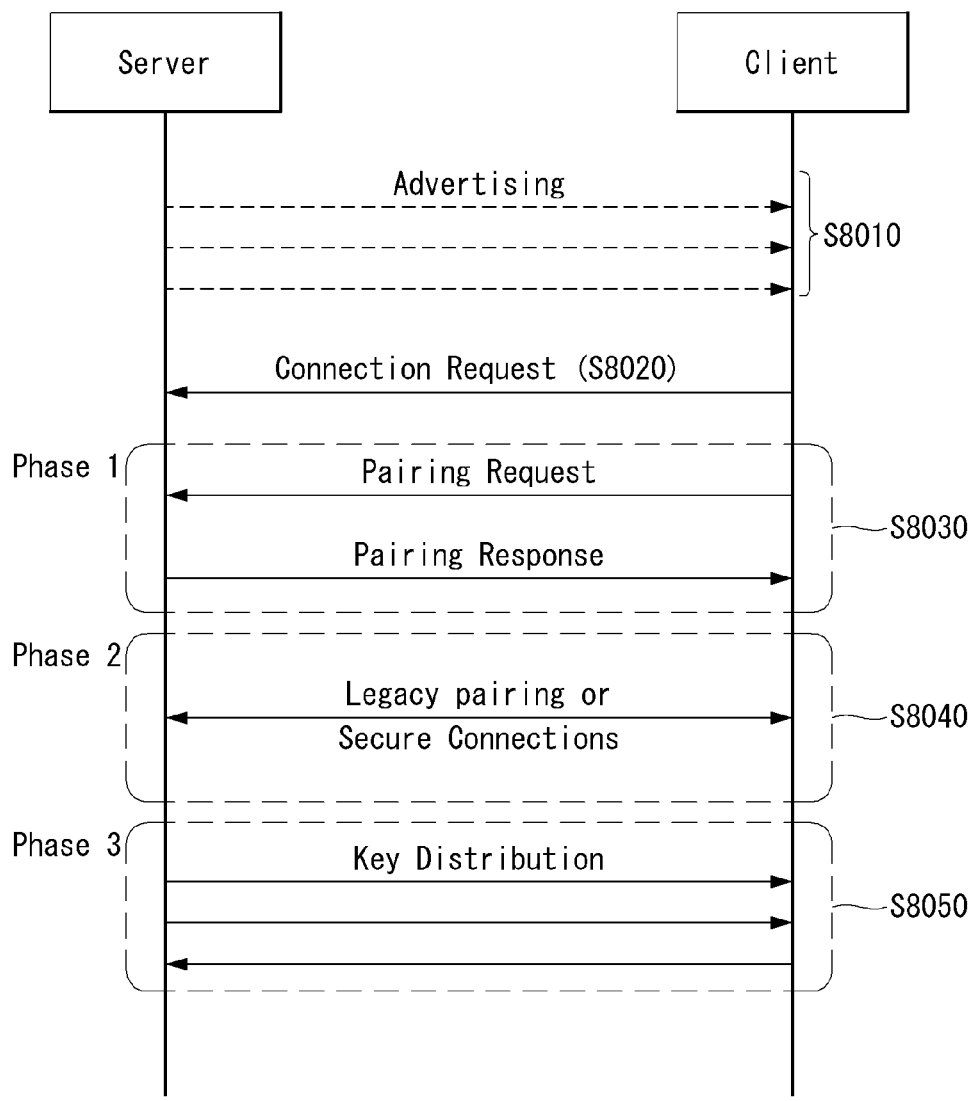

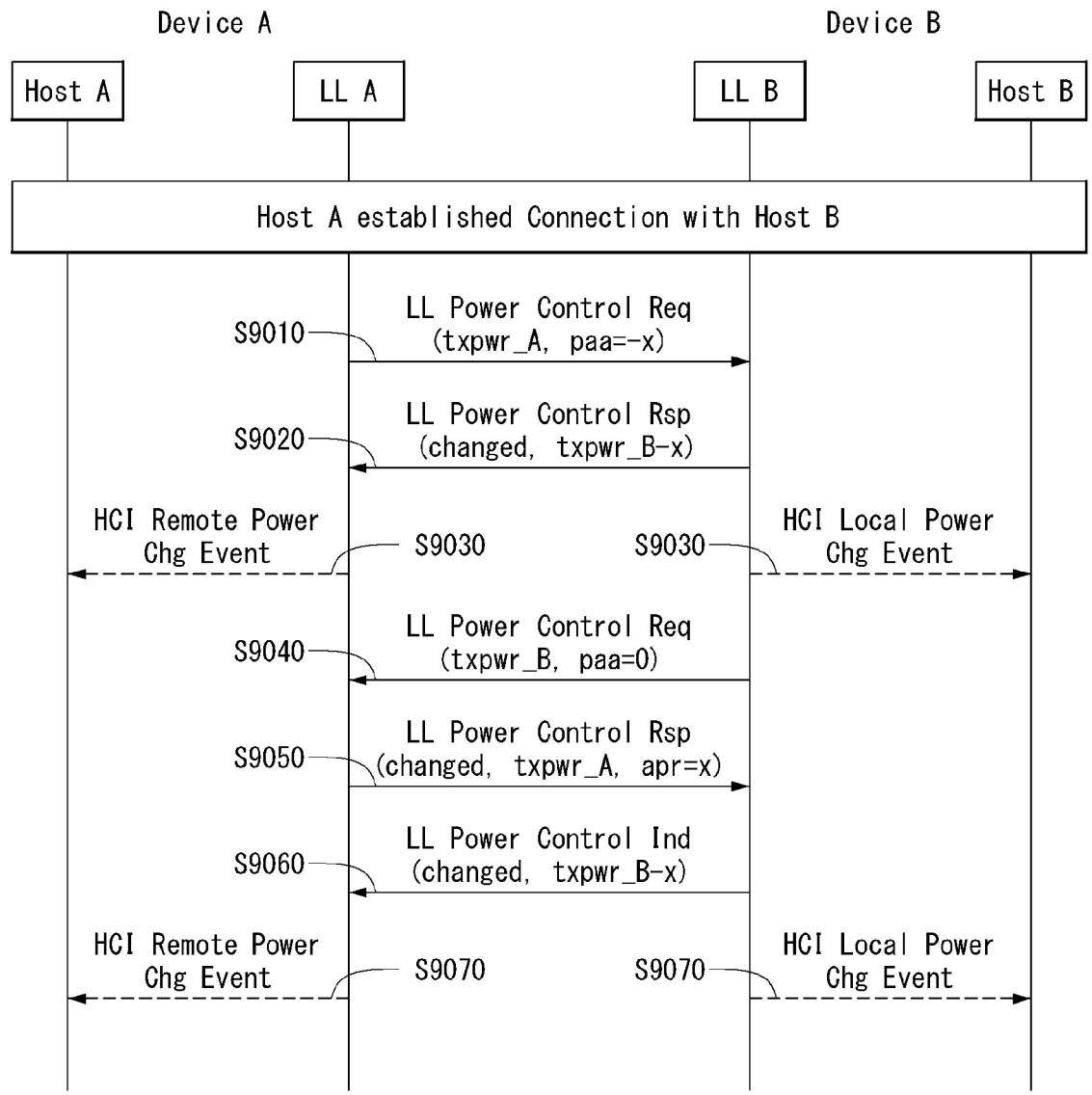
[Fig.9]

[Fig.10]
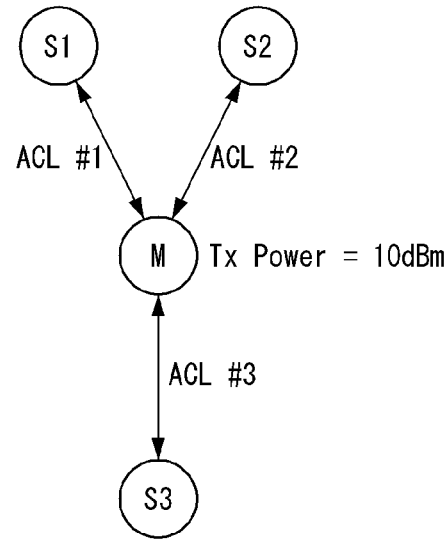
(a)
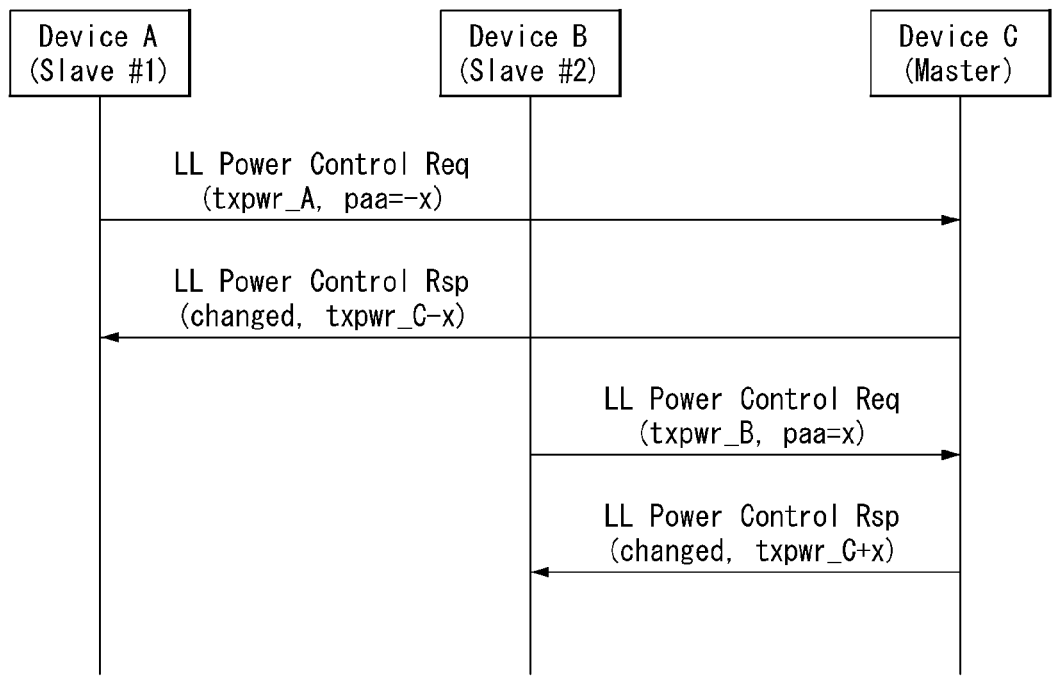
(b)

[Fig.11]
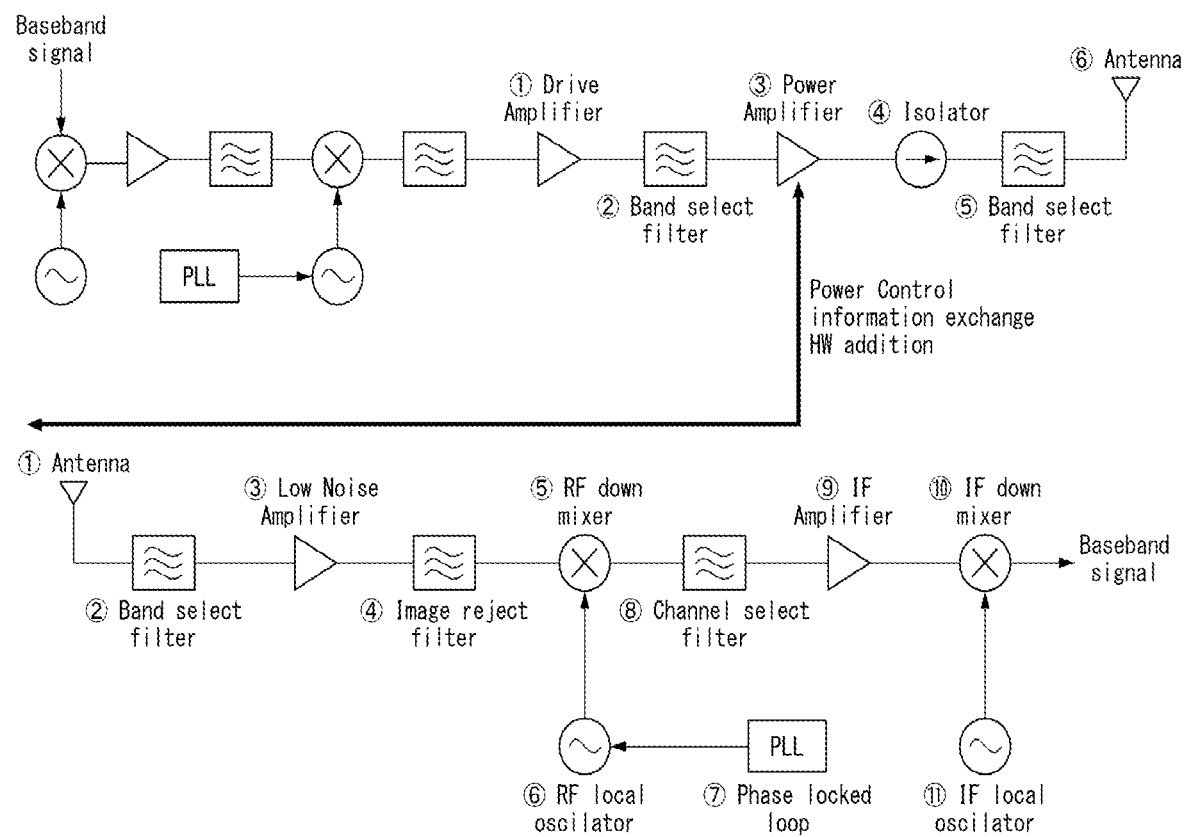

[Fig.12]
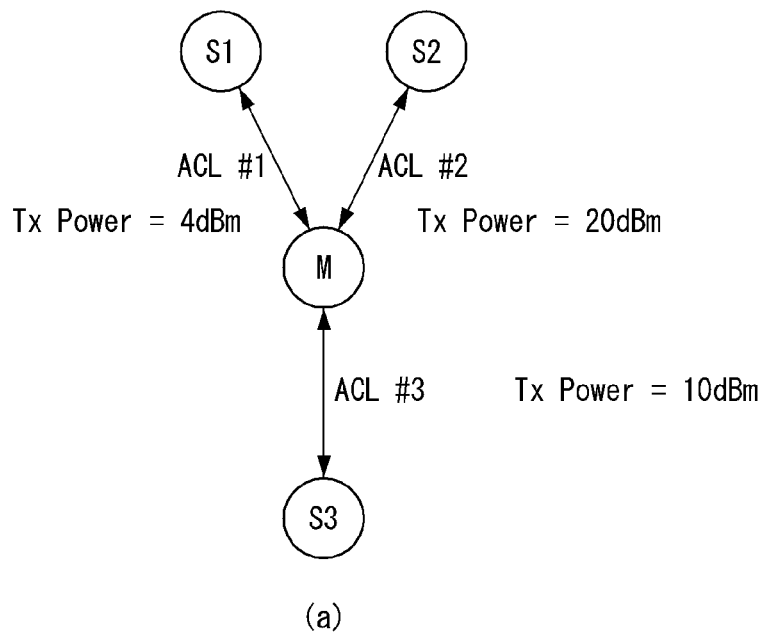
(a)
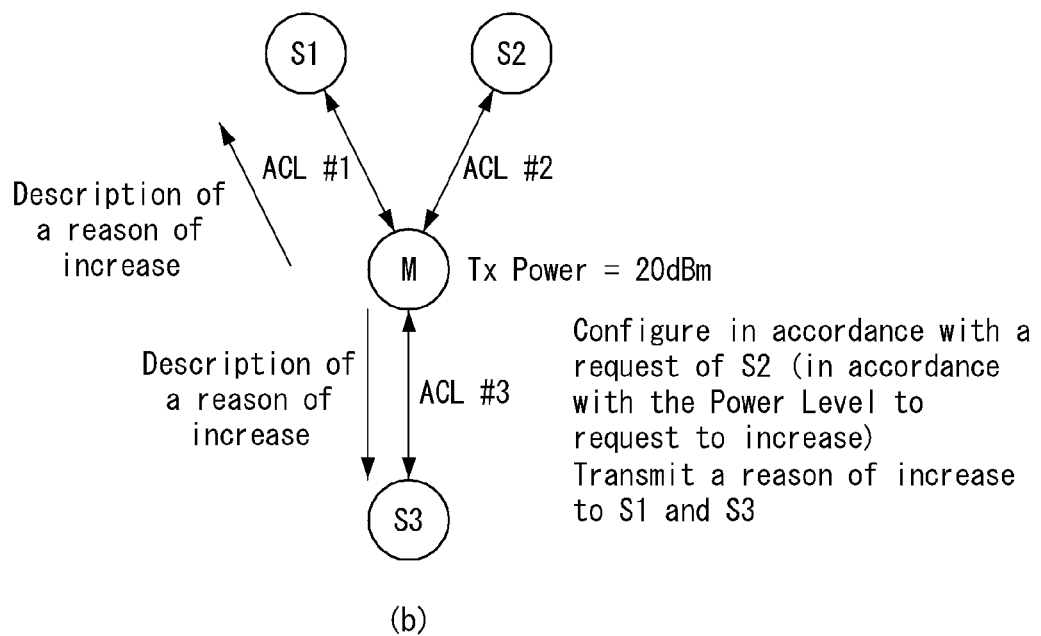
(b)

[Fig.13]
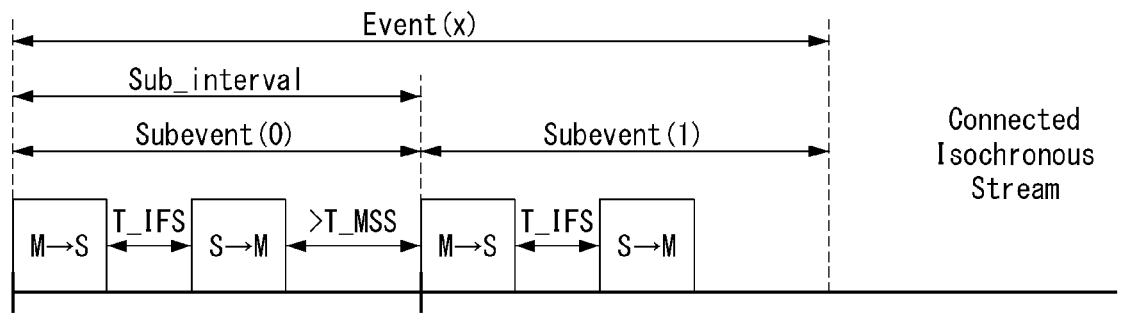
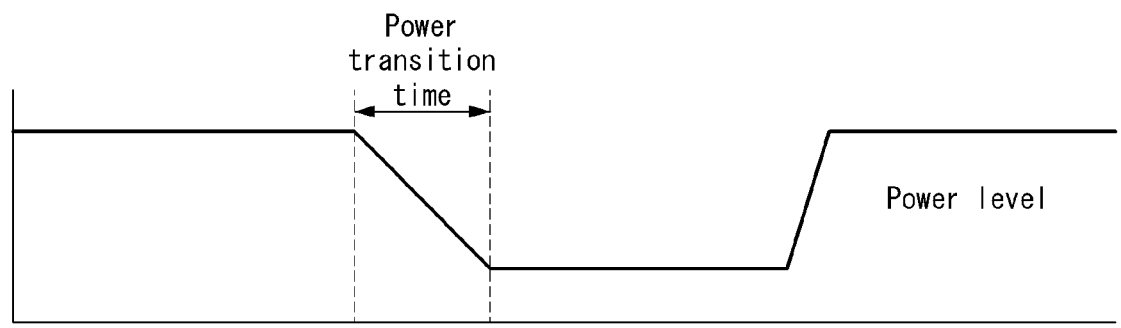
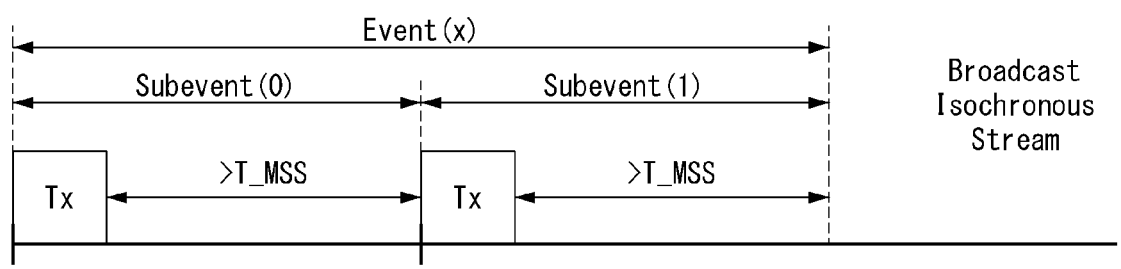

[Fig.14]
(a) 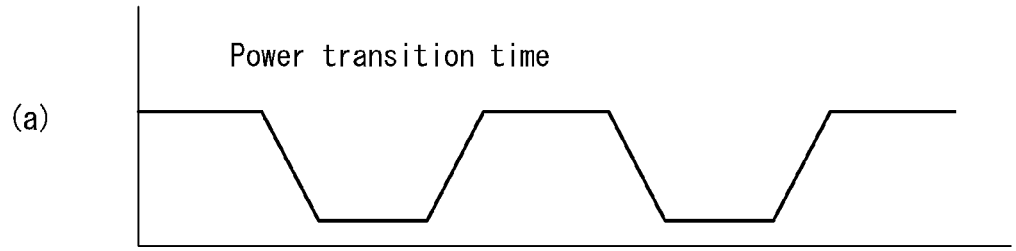
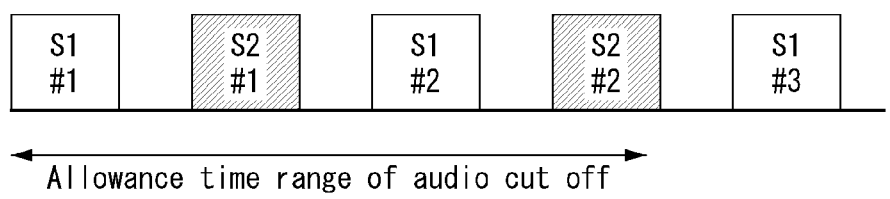
Allowance time range of audio cut off
(b) 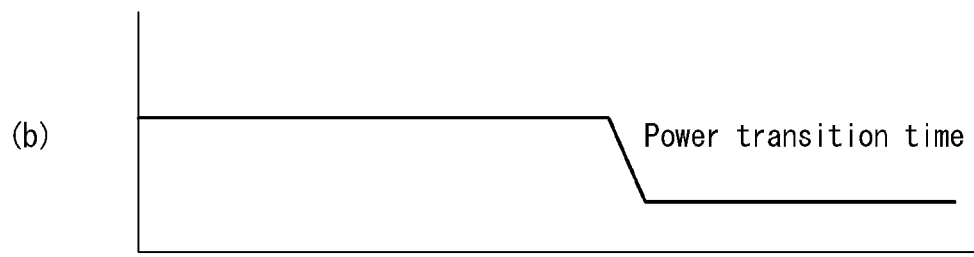
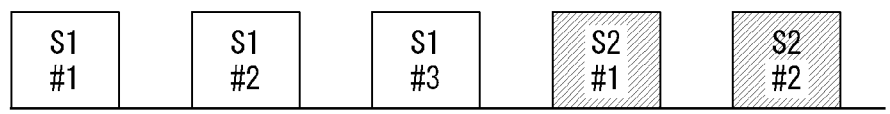
Stable power level duration time is in accordance with the allowance time range of audio cut off

[Fig.15]

| Command | OCF | Command Parameters | Return Parameters |
|---|---|---|---|
| HCI_LE_Read_Transmit_Power | 0x004B | | Status, Min_Tx_Power, Max_Tx_Power |

(a)

| Event | Event Code | Event Parameters |
|---|---|---|
| HCI_LE_CIS_Request | 0x3E | Subevent_Code, ACL_Connection_Handle, CIS_Connection_Handle, CIG_ID, CIS_ID |
| | | Iso_Interval, NSE, Payload_Size_M_TO_S, Payload_Size_S_TO_M, |
| | | PHY_M_TO_S, PHY_S_TO_M, FT_M_TO_S, FT_S_TO_M, BN_M_TO_S, BN_S_TO_M |

(b)

[Fig.16]
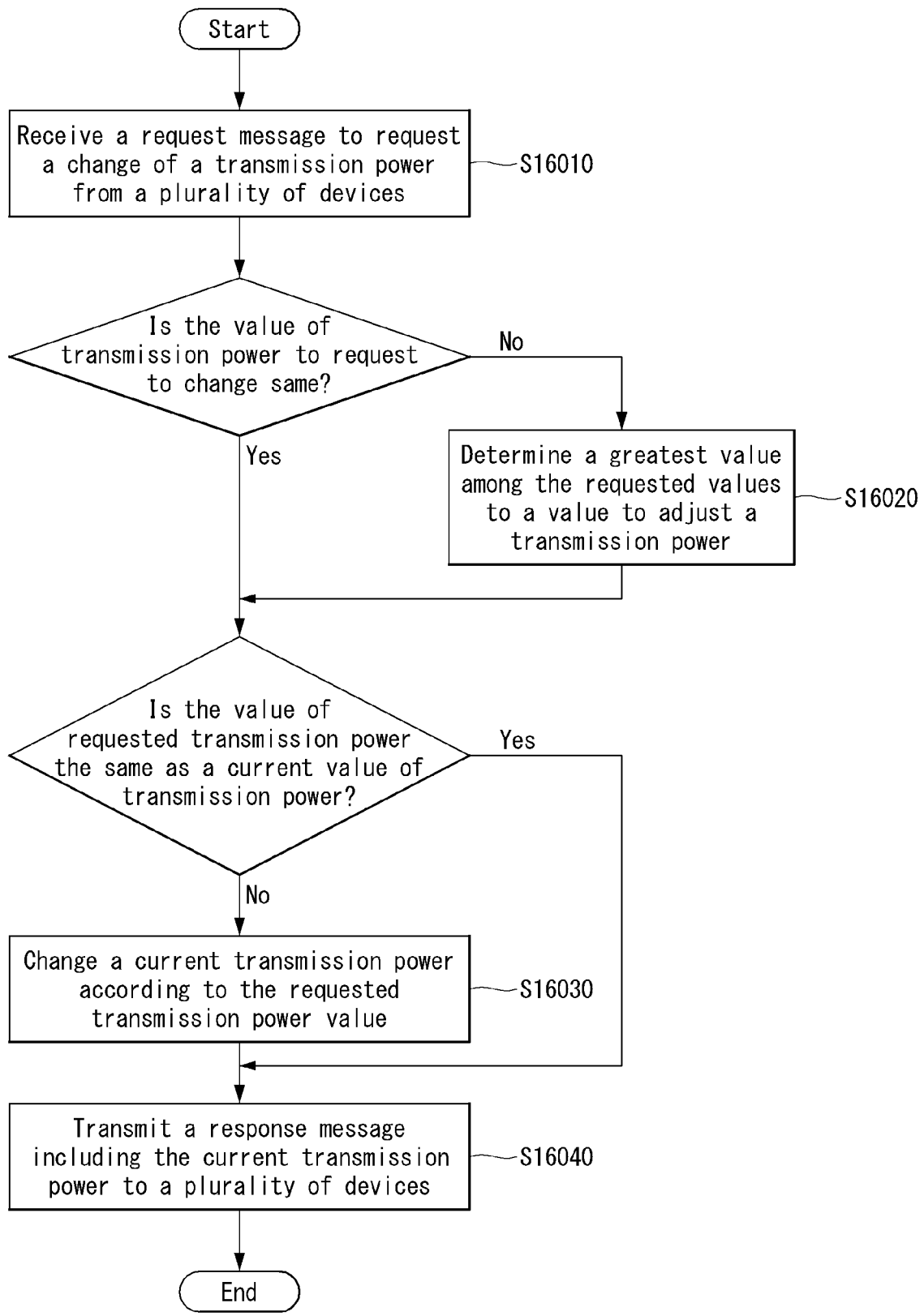

[Fig.17]
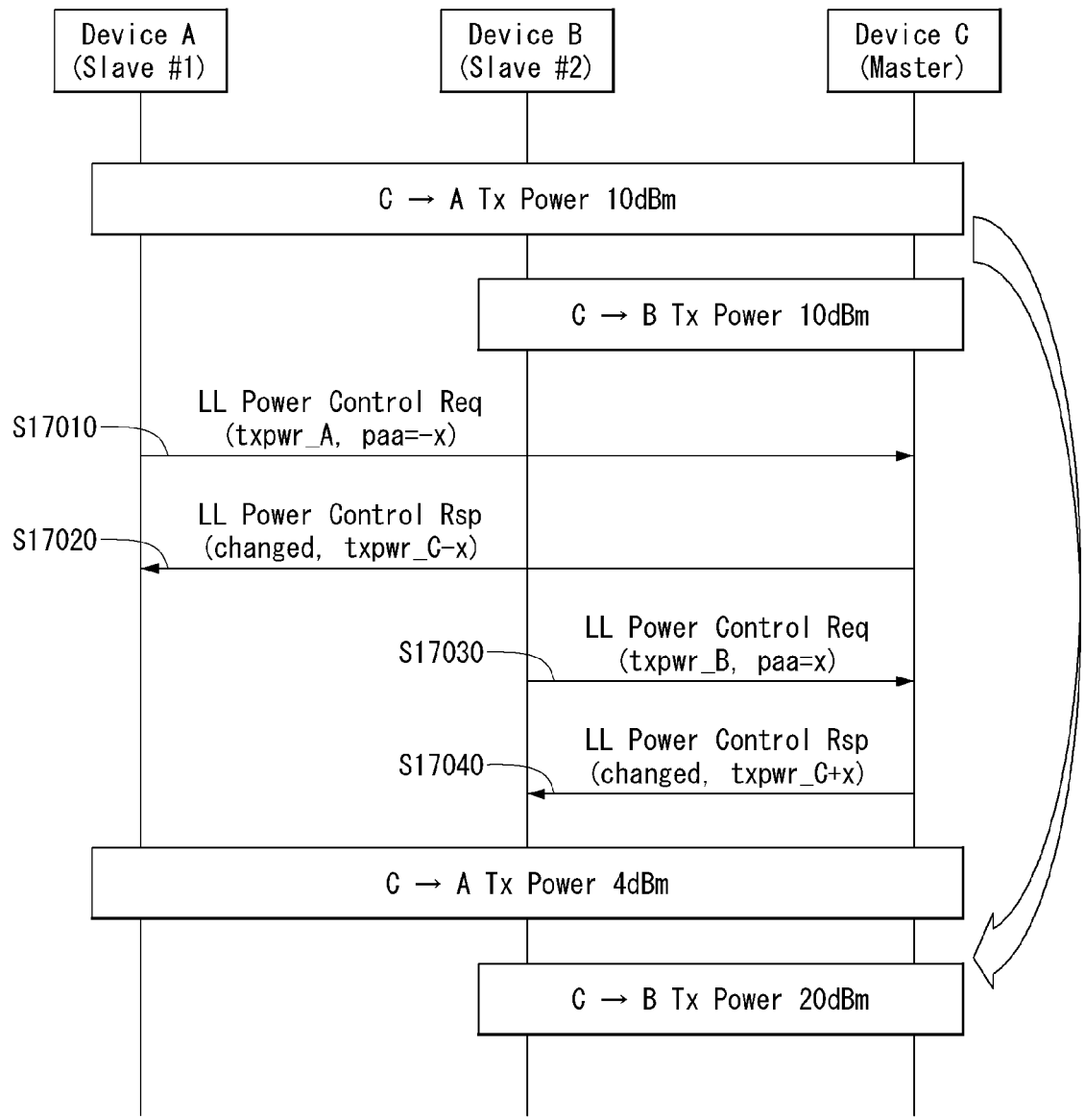

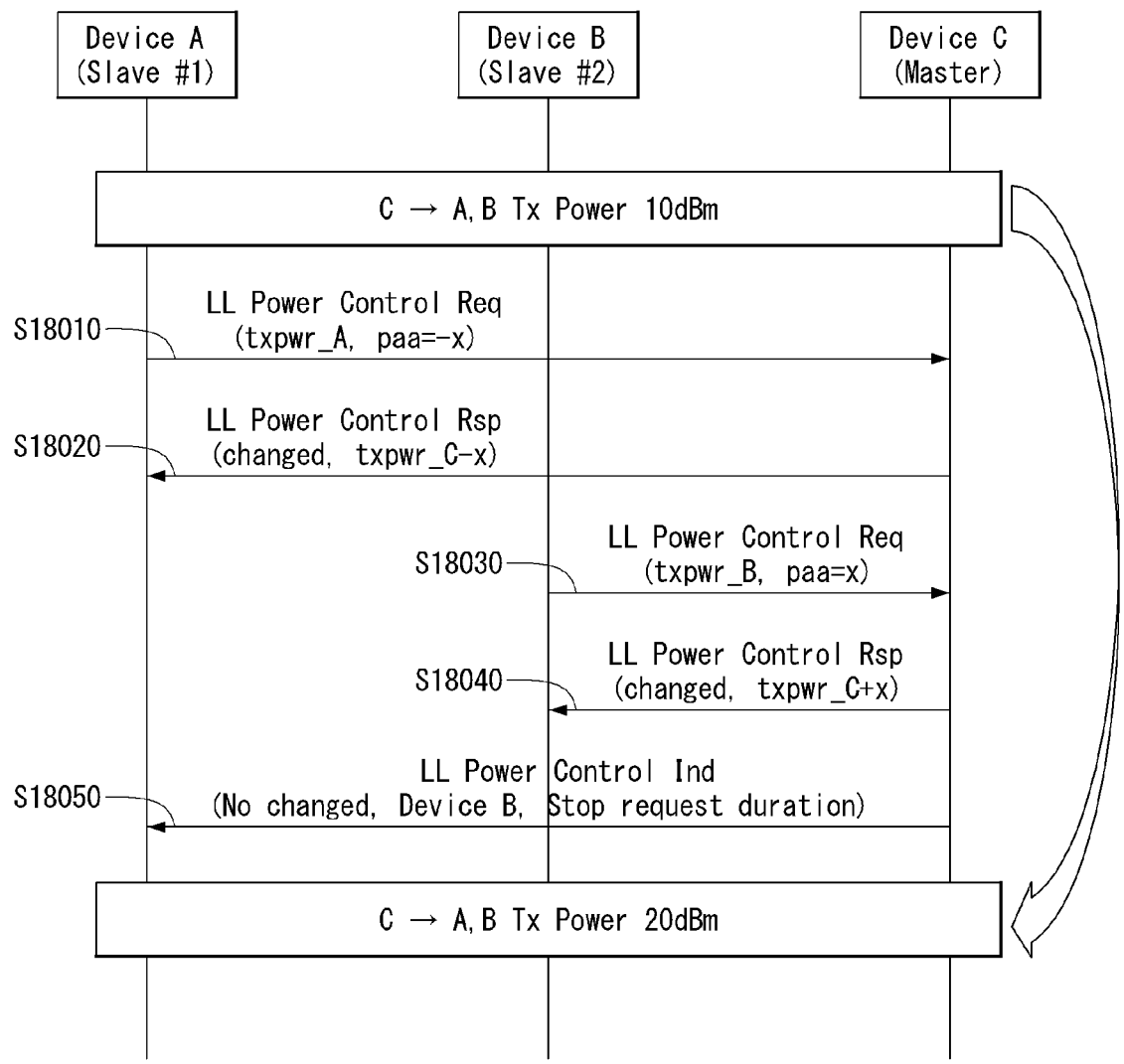
[Fig.18]

[Fig.19]
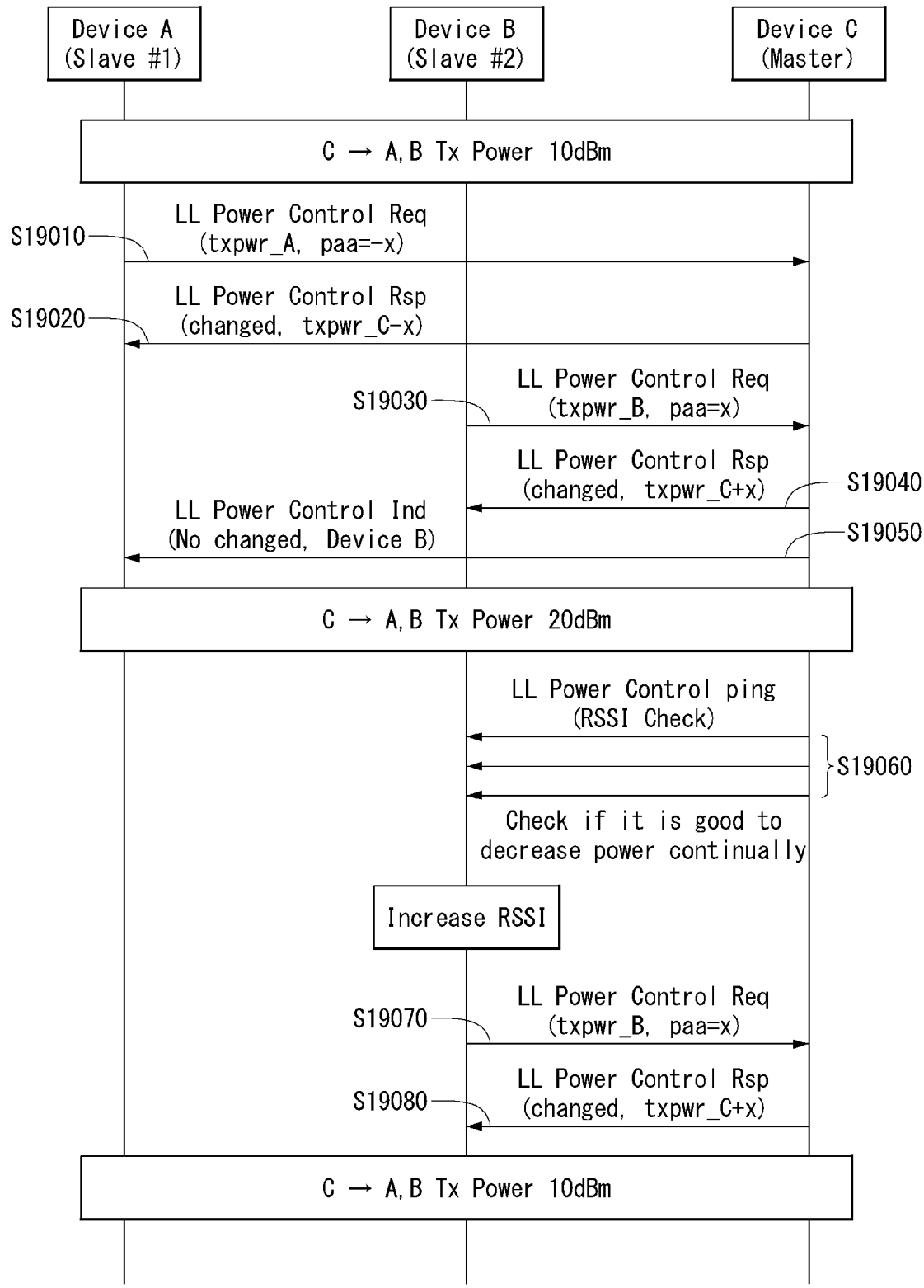

METHOD AND APPARATUS FOR CONTROLLING POWER OF DEVICE BY USING BLUETOOTH TECHNOLOGY

This application is the National Stage filing under 35 U.S.C. 371 of International Application No. PCT/KR2019/006908, filed on Jun. 7, 2019, which claims the benefit of KR Application No. 10-2018-0065352, filed on Jun. 7, 2018, the contents of which are all hereby incorporated by reference herein in their entirety.

TECHNICAL FIELD

The present disclosure relates to a method and apparatus for controlling a device by using Bluetooth which is a short-range communication technique in a wireless communication system and, more particularly, to a method and apparatus for controlling transmission power of a plurality of devices using the Bluetooth technology.

BACKGROUND ART

Bluetooth is an near field communication (NFC) technology standard allowing various devices to be wirelessly connected in a near field to exchange data. In a case in which two devices intend to perform wireless communication using Bluetooth communication, a user may perform a procedure for discovering a Bluetooth device with which he or she wants to communicate and requesting a connection. In the present disclosure, a device may refer to an apparatus or an appliance.

Here, the user may discover a Bluetooth device according to a Bluetooth communication method intended to be used using the Bluetooth device, and subsequently perestablish a connection.

Bluetooth communication methods include a basic rate/enhanced data rate (BR/EDR) method and a low energy (LE) method which is a low power method. The BR/EDR method may be referred to as Bluetooth Classic. The Bluetooth classic method includes a Bluetooth technology that has been continued from Bluetooth 1.0 using a basic rate and a Bluetooth technology using an enhanced data rate supported since Bluetooth 2.0.

The Bluetooth low energy (BLE) technology has been applied since Bluetooth 4.0 and may stably provide information of hundreds of kilobytes (KB) by consuming low energy. The BLE technology exchanges information between devices by utilizing an attribute protocol. This BLE method may reduce energy consumption by reducing overhead of a header and simplifying an operation.

Some Bluetooth devices do not have a display or a user interface. Complexity of connection/management/control/disconnection between various kinds of Bluetooth devices and Bluetooth devices employing similar technologies has increased.

Further, although Bluetooth may achieve a relatively high speed at a relatively low power and low cost, a transmission distance is generally limited to a maximum of 100 m, and thus, Bluetooth is suitable for use in a limited space.

DISCLOSURE

Technical Problem

In an aspect, the present disclosure is to provide a method and apparatus for controlling transmission power using the Bluetooth technology.

In addition, the present disclosure is to provide a method and apparatus for changing transmission powers of a plurality of devices to a requested value of each of the devices on a time axis.

In addition, in the case that a plurality of devices requests to change a transmission power on a time axis, the present disclosure is to provide a method and apparatus for changing all the transmission powers of a plurality of devices to a specific value.

Technical objects to be achieved by the present disclosure are not limited to the aforementioned technical objects, and other technical objects not described above may be evidently understood by a person having ordinary skill in the art to which the present disclosure pertains from the following description.

Technical Solution

The present disclosure provides a method and apparatus for controlling power performed by a control device by using the Bluetooth Low Energy technology in a wireless communication system.

Particularly, a method for controlling a power in a wireless communication system performed by a control device includes establishing a connection with a first device and a second device through Bluetooth Low Energy (BLE); receiving, from the first device, a first request message for requesting a transmission power change of the first device, and the first request message includes a first transmission power value of a transmission power of the first device and a first change value of a transmission power; receiving, from the second device, a second request message for requesting a transmission power change of the second device, and the second request message includes a second transmission power value of a transmission power of the second device and a second change value of a transmission power; and changing a transmission power of the control device to a specific transmission power value based on the first change value and the second change value, and the specific transmission power value is a value of a third transmission power value, which is the transmission power of the control device, added by the first change value or the second change value.

In addition, in the present disclosure, the method further includes transmitting a response message including the specific transmission power value to the first device and the second device.

In addition, in the present disclosure, when the specific transmission power value is a value of the third transmission power value added by the first change value, and the response message transmitted to the second device includes reason information related to a reason why the specific transmission power value is changed based on the first change value.

In addition, in the present disclosure, when the specific transmission power value is a value of the third transmission power value added by the second change value, the response message transmitted to the first device includes reason information related to a reason why the specific transmission power value is changed to the value of the third transmission power value added by the second change value.

In addition, in the present disclosure, the specific transmission power value is changed based on a greater value between the first change value and the second change value.

In addition, in the present disclosure, the method further includes identifying a Received Signal Strength Indicator (RSSI) or a Path Loss of the first device or the second device.

In addition, in the present disclosure, when the RSSI is a threshold value or greater, the method further includes receiving, from the first device or the second device, a third request message for requesting a decrease of the transmission power of the control device, and the third request message includes a third change value related to a decreased transmission power; and transmitting the response message including the decreased third transmission power value to the first device or the second device.

In addition, in the present disclosure, the specific transmission power value is differently configured for each of a link, a stream or an event for providing a specific service between the first device and the second device.

In addition, in the present disclosure, a controller and a host of the control device exchange at least one parameter value through a Host Controller Interface (HCI) command to configure the specific transmission power value differently for each of the link, the stream or the event between the first device and the second device.

In addition, the present disclosure includes a communication unit for communicating with an exterior wirelessly or wirely; and a processor functionally connected to the communication unit, wherein the processor is configured to: establish a connection with a first device and a second device through Bluetooth Low Energy (BLE); receive, from the first device, a first request message for requesting a transmission power change of the first device, and the first request message includes a first transmission power value of a transmission power of the first device and a first change value of a transmission power; receive, from the second device, a second request message for requesting a transmission power change of the second device, and the second request message includes a second transmission power value of a transmission power of the second device and a second change value of a transmission power; and change a transmission power of the control device to a specific transmission power value based on the first change value and the second change value, and the specific transmission power value is a value of a third transmission power value, which is the transmission power of the control device, added by the first change value or the second change value.

Advantageous Effects

In the case of using the Bluetooth technology according to an embodiment of the present disclosure, there is an effect that a transmission power may be increased or decreased by controlling a transmission power in a communication using Bluetooth.

In addition, according to the present disclosure, a transmission power of each of a plurality of devices is changed to a requested value, and there is an effect that the request of each of the devices may be satisfied.

In addition, according to the present disclosure, in the case that a transmission power is requested from each of a plurality of devices, a transmission power is changed to a specific value among the requested values, there is an effect that the latency of service provision may be prevented, which may occur since transmission powers of devices are different.

It will be appreciated by persons skilled in the art that that the effects that could be achieved with the present disclosure are not limited to what has been particularly described hereinabove and other advantages of the present disclosure will be more clearly understood by a person skilled in the art to which the present disclosure pertains, from the following detailed description.

DESCRIPTION OF DRAWINGS

The accompany drawings, which are included to provide a further understanding of the present disclosure and are incorporated on and constitute a part of this specification illustrate embodiments of the present disclosure and together with the description serve to explain the principles of the present disclosure.

FIG. 1 is a schematic diagram illustrating an example of a wireless communication system using the Bluetooth Low Power Energy technology proposed in the present disclosure.

FIG. 2 illustrates an example of an internal block diagram of a device which is available to implement the methods proposed in the present disclosure.

FIG. 3 is a diagram illustrating an example of a Bluetooth communication architecture to which the methods proposed in the present disclosure may be applied.

FIG. 4 is a diagram illustrating an example of a Bluetooth Low Power Energy audio stack architecture to which the methods proposed in the present disclosure may be applied.

FIG. 5 is a diagram illustrating an example of ICO (Isochronous Connection-Oriented) channel and stream to which the methods proposed in the present disclosure may be applied.

FIG. 6 is a diagram illustrating an example of ICL (Connectionless Isochronous) channel and stream to which the methods proposed in the present disclosure may be applied.

FIG. 7 is a diagram illustrating an example of an architecture of GATT (Generic Attribute Profile) of the Bluetooth Low Power Energy.

FIG. 8 is a flowchart illustrating an example of a connection procedure method in the Bluetooth Low Power Energy technique to which the methods proposed in the present disclosure may be applied.

FIG. 9 is a flowchart illustrating an example of a transmission power control method to which the present disclosure may be applied.

FIG. 10 is a diagram illustrating an example of a transmission power method in a multiple connection state to which the present disclosure may be applied.

FIG. 11 is a diagram illustrating an example of a block diagram for a power control method to which the present disclosure may be applied.

FIG. 12 is a diagram illustrating an example of a power control method to which the present disclosure may be applied.

FIGS. 13 and 14 are diagrams illustrating an example of a differential control method of a power for each logical link according to an embodiment of the present disclosure.

FIG. 15 is a diagram illustrating an example of a message format for a power control according to an embodiment of the present disclosure.

FIG. 16 is a flowchart illustrating an example of a power control method of a control device according to an embodiment of the present disclosure.

FIG. 17 is a flowchart illustrating an example of a power control method of a device according to an embodiment of the present disclosure.

FIG. 18 is a flowchart illustrating another example of a power control method of a device according to an embodiment of the present disclosure.

FIG. 19 is a flowchart illustrating another example of a power control method of a device according to an embodiment of the present disclosure.

MODE FOR DISCLOSURE

The aforementioned objects, features and advantages of the present disclosure will become more apparent through the following detailed description with respect to the accompanying drawings. Hereinafter, the embodiments of the present disclosure will be described with reference to the accompanying drawings, in which like numbers refer to like elements throughout the specification. In describing the present disclosure, a detailed description of known techniques associated with the present disclosure unnecessarily obscure the gist of the present disclosure, it is determined that the detailed description thereof will be omitted.

Hereinafter, a method and a device related to the present disclosure will be described in detail with reference to the accompanying drawings. In the following description, usage of suffixes such as 'module', 'part' or 'unit' used for referring to elements is given merely to facilitate explanation of the present disclosure, without having any significant meaning by itself.

FIG. 1 is a schematic diagram illustrating an example of a wireless communication system using Bluetooth low energy (BLE) technology to which the present disclosure may be applied.

A wireless communication system 100 includes at least one server device 120 and at least one client device 110.

The server device and the client device perform Bluetooth communication using a BLE technology.

First, BLE technology has a relatively small duty cycle, may be produced at low cost, and significantly reduces power consumption through a low data rate, and thus, it is possible to operate for more than a year in the case of using a coin cell battery, compared to Bluetooth basic rate/enhanced data rate (BR/EDR) technology.

In addition, the BLE technology simplifies a connection process between devices, and a packet size is smaller than that of the Bluetooth BR/EDR technology.

In BLE technology, (1) the number of RF channels is 40, (2) 1 Mbps is supported as a data rate, (3) topology is a scatternet structure, (4) latency is 3 ms, and (5) a maximum current is 15 mA or less, (6) output power is 10 mW (10 dBm) or less, and (7) the BLE technology is mainly used in applications such as mobile phones, watches, sports, healthcare, sensors, device control, and the like.

The server device 120 may operate as a client device in a relationship with other devices, and the client device may operate as a server device in a relationship with other devices. That is, in the BLE communication system, any one device may operate as a server device or a client device, and may operate as both a server device and a client device, if necessary.

The server device 120 may be represented as a data service device, a slave device, a slave, a server, a conductor, a host device, a gateway, a sensing device, a monitoring device and the like.

the client device 110 may be represented as a master device, a master, a client, a member, a sensor device, a sink device, a collector, a third device, a fourth device, and the like.

The server device and the client device correspond to main components of the wireless communication system, and the wireless communication system may include other components in addition to the server device and the client device.

The server device refers to a device which is provided with data from the client device, directly communicates with the client device, and provides data to the client device through a response when a data request is received from the client.

In addition, the server device sends a notification message and an indication message to the client device to provide data information to the client device. In addition, when the server device transmits the indication message to the client device, the server device receives a confirmation message corresponding to the indication message from the client.

In addition, in the process of transmitting and receiving the notification message, the indication message, and the confirmation message to and from the client device, the server device may provide data information to a user through a display unit or may receive a request input from a user through a user input interface.

In addition, the server device may read data from a memory unit or write new data to the corresponding memory in the process of transmitting and receiving a message to and from the client device.

In addition, one server device may be connected to a plurality of client devices and may be easily reconnected (or connected) with client devices by using bonding information.

The client device 120 refers to a device that requests data information and data transmission from the server device.

The client device receives data from the server device through the notification message, the indication message, and the like, and when the indication message is received from the server device, the client device sends a confirmation message in response to the indication message.

Similarly, the client device may provide information to the user through an output unit or receive an input from the user through the input unit in the process of transmitting and receiving a message to and from the server device.

In addition, the client device may read data from a memory or write new data into the corresponding memory in the process of transmitting and receiving a message to and from the server device.

Hardware components such as the output unit, the input unit, and the memory of the server device and the client device will be described in detail with reference to FIG. 2.

In addition, the wireless communication system may configure personal area networking (PAN) through Bluetooth technology. For example, in the wireless communication system, files, documents, and the like may be exchanged quickly and safely by establishing a private piconet between devices.

FIG. 2 illustrates an example of an internal block diagram of a device which is available to implement the methods proposed in the present disclosure.

As shown in FIG. 2, a server device includes a display unit 111, a user input interface 112, a power supply unit 113, a processor 114, a memory unit 115, a Bluetooth interface 116, other interfaces 117 and a communication unit (or transceiver) 118.

The display unit 111, the user input interface 112, the power supply unit 113, the processor 114, the memory unit 115, the Bluetooth interface 116, the other interface 117 and the communication unit 118 are functionally connected to perform the method proposed in the present disclosure.

In addition, a client device includes a display unit 121, a user input interface 122, a power supply unit 123, a processor 124, a memory unit 125, a Bluetooth interface 126 and a communication unit (or transceiver) 127.

The display unit 121, the user input interface 122, the power supply unit 123, the processor 124, the memory unit 125, the Bluetooth interface 126 and the communication unit 127 are functionally connected to perform the method proposed in the present disclosure.

The Bluetooth interface 116 or 126 is referred to as a unit (or module) which is available to transmit a request/response, a command, an alarm, an indication/acknowledge message or a data between devices by using the Bluetooth technology.

The memory 115 or 125 is a unit implemented in various types of devices and referred to as a unit in which various types of data are stored.

The processor 114 or 124 is referred to a module for controlling overall operations of the server device or the client device and controls to process a transmission request of a message through the Bluetooth interface or other communication interface and process a received message.

The processor 114 or 124 may be represented as a control part, a control unit, a controller, and the like.

The processor 114 or 124 may include an application-specific integrated circuit (ASIC), other chipset, a logical circuit and/or a data processing device.

The processor 114 or 124 controls the communication unit to receive an Advertising message from the server device, controls the communication unit to transmit a Scan Request message to the server device and receive a Scan Response message from the server device in response to the Scan Request, and controls the communication unit to transmit a Connection Request message to the server device for a Bluetooth connection configuration with the server device.

In addition, the processor 114 or 124 controls the communication unit to read or write data using an attribute protocol from the server device after a Bluetooth LE connection is established through the connection procedure.

The memory 115 or 125 may include read-only memory (ROM), random access memory (RAM), flash memory, a memory card, a storage medium and/or other storage device.

The communication unit 118 or 127 may include a baseband circuit for processing a wireless signal. When an embodiment is implemented in software, the technique may be implemented as a module (process, function, etc.) for performing the function described above. The module may be stored in the memory and executed by the processor.

The memory 115 or 125 may be interior or exterior of the processor 114 or 124 and may be connected to the processor 114 or 124 with a well-known means.

The display unit 111 or 121 is referred to a module for providing state information or message exchange information of a device to a user using a screen.

The power supply unit (power source supply unit) 113 or 123 is referred to a module for receiving an external power source or an internal power source under a control of a controller and supplying a power required for an operation of each of the elements.

As described above, the BLE technology has a small duty cycle and may reduce a power consumption significantly with a low-speed data transmission rate.

The user input interface 112 or 122 is referred to a module for a user to control an operation of a device by providing a user input like a screen button to the controller.

FIG. 3 is a diagram illustrating an example of a Bluetooth communication architecture to which the methods proposed in the present disclosure may be applied.

Particularly, FIG. 3 shows an example of the architecture of Bluetooth Low Energy (LE).

As shown in FIG. 3, the BLE architecture includes a Controller stack operable to process a wireless device interface of which timing is important and a Host stack operable to process a high level data.

The Controller stack may also be referred to as a Controller but referred to as the Controller stack below in order to avoid a confusion with the processor which is an internal element of the device mentioned with reference to FIG. 2 above.

First, the Controller stack may be implemented by using a communication module that may include a Bluetooth wireless device and a processor module that may include a processing device such as a microprocessor, for example.

The Host stack is a part of the OS operated on a processor module or may be implemented as an instantiation of a package on the OS.

In a part of instances, the Controller stack and the Host stack may be operated or executed on the same processing device in the processor module.

The Host stack includes GAP (Generic Access Profile) 310, GATT based Profiles 320, GATT (Generic Attribute Profile) 330, ATT (Attribute Protocol) 340, SM (Security Manage) 350 and L2CAP (Logical Link Control and Adaptation Protocol) 360. However, the Host stack is not limited thereto, but may include various protocols and profiles.

The host stack may multiplex various protocols, profiles, and the like provided in the higher Bluetooth layer by using the L2CAP.

First, the logic link control and adaptation protocol (L2CAP) 360 may provide one bidirectional channel for transmitting the data to a specific protocol or profile.

The L2CAP is operable to multiplex the data among higher layer protocols, segment and reassemble packages, and manage multicast data transmission.

In the BLE, three fixed channels (one for a signaling CH, one for the security manager, and one for the attribute protocol) are used.

On the contrary, in basic rate/enhanced data rate (BR/EDR), the dynamic channel is used and the protocol service multiplexer, the retransmission, the streaming mode, and the like are supported.

The security manager (SM) 350 is a protocol for authenticating the device and providing key distribution.

The attribute protocol (ATT) 340 defines a rule for accessing data of a counter device in a server-client structure. The ATT includes six following message types (request, response, command, notification, indication, and confirmation).

That is, ① Request and Response message: a request message refers to the message used by a client device to request specific information to a server device, and a response message refers to the message transmitted by the server device to the server device in response to the request message.

② Command message: a message transmitted from a client device to a server device to command a specific operation. The server device does not transmit a response to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

The generic access profile (GAP) 45 as a layer newly implemented for the BLE technology is used for selecting a role for communication among BLE devices and control how multi profiles are actuated.

Further, the GAP is primarily used in device discovery, connection creation, and security procedure parts and defines a scheme for providing the information to the user and defines the type of the attribute.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

GATT-based Profiles are profiles having a dependency on the GATT and is used mainly for BLE devices. GATT-based Profiles includes Battery, Time, FindMe, Proximity, Time, Object Delivery Service and the like; specific contents of the GATT-based profiles are as follows.

Battery: Battery information exchanging method
Time: Time information exchanging method
FindMe: Provision of alarm service according to distance
Proximity: Battery information exchanging method
Time: Time information exchanging method GATT is operable as a protocol for describing how the ATT is used at the time of setting the services. For example, the GATT is operable to regulate how ATT attributes are together grouped by the services and operable to describe features associated with the services.

Therefore, the GATT and the ATT may use the features in order to describe the status of the device and the services and describe how the features are associated with each other and how the features are used.

The Controller stack includes a Physical Layer 390, a Link Layer 380 and a Host Controller Interface 370.

The Physical Layer (wireless transceiver module) 390 is a layer of transmitting and receiving a wireless signal of 2.4 GHz and uses GFSK (Gaussian Frequency Shift Keying) modulation and a frequency hopping technique configured with 40 RF channels.

The Link Layer 380 transmits or receives a Bluetooth packet.

In addition, the Link Layer 380 provides functions of generating a connection between devices after performing Advertising and Scanning functions using three Advertising channels and exchanging a data packet of maximum 42 bytes through 37 channels.

The HCI (Host Controller Interface) provides an interface between the Host stack and the Controller stack so as to provide a command and a data from the Host stack to the Controller stack and provide an event and a data from the Controller stack to the Host stack.

Therefore, the generic attribute profile 44 and the attribute protocol (ATT) 43 may use the features in order to describe the status of the device and the services and describe how the features are associated with each other and how the features are used.

Hereinafter, the procedures of the Bluetooth low energy (BLE) technology will be described in brief.

The BLE procedures may be divided into a device filtering procedure, an advertising procedure, s scanning procedure, a discovering procedure, a connecting procedure, and the like.

As illustrated in FIG. 4, the device may support only the Bluetooth BR/EDR or LE and may operate in a dual mode supporting both the Bluetooth BR/EDR and LE.

A device operating in the dual mode may establish a security connection through secure simple pairing with the device supporting only the BR/EDR through a link manager, and establish a security connection through a security manager with the device supporting only the LE.

Hereinafter, the procedures of the Bluetooth low energy (BLE) technology will be described in brief.

The BLE procedures may be divided into a device filtering procedure, an advertising procedure, s scanning procedure, a discovering procedure, a connecting procedure, and the like.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertizing procedure to perform undirected broadcast to devices within a region.

Here, undirected broadcast refers to broadcasting in all directions rather than in a specific direction.

On the other hand, directed broadcast refers to broadcasting in a specific direction. Undirected broadcast is performed without involving a connection procedure between an advertising device and a device in a listening state (in what follows, it is called a listening device).

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of data from advertising devices using an advertising physical channel.

The scanning device transmits a scan request to an advertising device through an advertising physical channel in order to request additional data from the advertising device. The advertising device transmits a scan response as a response with respect to the scan request, by including additional data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device perestablishing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

FIG. 4 is a diagram illustrating an example of a Bluetooth Low Power Energy audio stack architecture to which the methods proposed in the present disclosure may be applied.

FIG. 4(*a*) shows an example of an audio stack architecture for providing an audio service of BLE, and FIG. 4(*b*) shows an example of a message format therefor.

In the stack architecture shown in (a) of FIG. 4, the definition of each term is as described below.

physical channel: An RF hopping sequence compatible in a synchronized Bluetooth baseband piconet: A Bluetooth device set sharing the same physical channel defined as a master parameter (clock and BD_ADDR)

physical link: A baseband level connection between two devices configured by using a paging. The physical link includes a sequence of transport slots on a physical channel which is alternating between master and slave transport slots.

In the case that an audio service is provided using the BLE audio stack, a control device may control a transmission power of connected devices. In this case, the factors required for the control of transmission power may be as described below.

Different power levels needs to be allowed in different LE physical links.

All logical links through an LE physical link on the same PHY need to be in the same power level.

Hereinafter, it is described a channel for providing an audio service through the BLE.

FIGS. 5 and 6 are diagrams illustrating an example of a channel and a stream of ICO (Isochronous Connection-Oriented) and ICL (Connectionless Isochronous) to which the methods proposed in the present disclosure may be applied.

In Bluetooth LE, an Isochronous Channel which is a channel for transmitting and receiving audio data is divided into ICO and ICL.

ICO is a channel based on a connection of Bluetooth LE and may be configured after an ACL connection is established between two devices connected with Bluetooth LE.

An application profile may require an isochronous stream having one or more time related channel. A profile manage (or a part of middle ware) manages requests of several profiles, allocates a Stream ID for each profile, and allocates a Channel ID for a channel in a corresponding profile. The Stream ID and the Channel ID are transmitted when a Master (M) configures an ICO channel to slave 1 (S1) and slave 2 (S2), as shown in FIG. 10.

In the case of ICO, a single stream may be sent to S1 and S2 by dividing by two Channel IDs. For example, in the case that S1 is a wireless earphone mounted on right ear of a user and S2 is a wireless earphone mounted on left ear of a user, the user may listen to the music transmitted by M in stereo as shown in FIG. 10.

ICL is a channel not based on a connection of Bluetooth LE and used for broadcasting or multicasting of an isochronous data. Broadcasting of isochronous data of an ICL channel may be performed by using the frequency hopping technique.

ICO and ICL may transmit an audio signal to a plurality of devices and a plurality of profiles using the Stream ID and the Channel ID.

Table 2 below represents an example of device types defined in the audio technique of Bluetooth LE and an operation scheme according to the device types.

TABLE 2

| Device | Event | Initiation | Underlying Action | Typical | Max |
|---|---|---|---|---|---|
| Phone | Incoming Call | External | ICO established | 2 sec | 5 sec |
|  | Start Call | User initiated on phone | ICO established | 2 sec | 5 sec |
| TV | Turn On | User selects HA connection with controller. | ICO established | 5 sec | 10 sec |
|  | Turn On | ISO established wih speakers? | ICO established | 5 sec | 10 sec |
|  | Add user | Needs Controller | Distribute GLK | 5 sec | 10 sec |
| Tablet | Video play | Local on tablet | ICO changes to ICL | 2 sec | 5 sec |
|  | Add user | User initiated | ICO > changes to ICL | 2 sec | 5 sec |
| Laptop | VoIP Call | External (incoming call) | ISO established | 2 sec | 5 sec |
|  |  | User initiated | ISO established | 2 sec | 5 sec |
| Remote Control | User press | Local (select device or volume, etc.) | ACL command to HA | 1 sec | 3 sec |
|  | Find Broadcasters | Background task? | Scan Audio-As | ? | 10 sec |
| Speaker | User presses ON | Local (connects to default source) | ICO established | 5 sec | 10 sec |
|  | User changes audio source | Action at speaker (if supported) or source | ICO established | 5 sec | 10 sec |
| Doorbell | Rings | External | ISO established | 2 sec | 5 sec |
| HA/Headset | Start Call | User initiated (open voice recog. channel) | ISO established | 1 sec | 4 sec |
| Audio Gateway | Voice Command | External (User intitiating) | ISO established | 1 sec | 3 sec |

FIG. 7 is a diagram illustrating an example of a structure of a GATT of BLE.

A structure for exchanging profile data of BLE will be described with reference to FIG. 7.

Specifically, the GATT defines a method of exchanging data using services and characteristics between Bluetooth LE devices.

In general, a peripheral device (e.g., a sensor device) acts as a GATT server and has definitions of services and characteristics, and a central device acts as GATT client.

A GATT client send a data request to the GATT server to read or write data, and all transactions begin at the GATT client and a response is from the GATT server.

The GATT-based operation structure used in the Bluetooth LE is based on a profile, a service, and a characteristic and may have a vertical structure as shown in FIG. 7.

The profile includes one or more services, the one or more services may include one or more characteristics or other services.

The service serves to divide data into logical units and may include one or more characteristics or other services. Each service has a 16-bit or 128-bit identifier called a universal unique identifier (UUID).

The characteristic is the lowest level unit in the GATT-based operation structure. The characteristic includes only one data and has a 16-bit or 128-bit UUID similar to the service.

The characteristic is defined as a value of various pieces of information and requires one attribute to include each information. The characteristic may use various continuous attributes.

The attribute includes four components and has the following meaning.

handle: address of attribute
    Type: Type of attribute
    Value: Value of attribute
    Permission: authority to access attribute FIG. 8 is a flowchart illustrating an example of a connection procedure method in the Bluetooth Low Power Energy technique to which the methods proposed in the present disclosure may be applied.

A server transmits an Advertising message to a client through three Advertising channels (step, S8010).

Before a connection, the server may be called an Advertiser and, after a connection, the server may be called a Master. An example of the server is a sensor (temperature sensor, etc.).

In addition, the client may be called a Scanner before a connection and may be called a Slave after a connection. An example of the client is a smart phone.

As described above, Bluetooth performs a communication by dividing into total 40 channels through 2.4 GHz band. Three channels among the 40 channels are used for an exchange of packets such as various Advertising Packets transmitted and received to establish a connection.

The remaining 37 channels are used for an exchange of data after a connection to a data channel.

The client may receive the Advertising message, and then, transmit a Scan Request message to the server to obtain an additional data (e.g., server device name, etc.).

In this case, the server transmits a Scan Response message including an additional data in response to the Scan Request message.

Here, the Scan Request message and the Scan Response message may be types of an Advertising packet, and the Advertising packet may include only a User Data of 31 byte or smaller.

Accordingly, in the case that there is a data of which size is greater than 3 bytes but of which overhead is great to send a data by establishing a connection, the data is sent in a dividing manner through two times using the Scan Request message/the Scan Response message.

Next, the client transmits a Connection Request message for a Bluetooth connection configuration with the server to the server (step, S8020).

Through this, a Link Layer (LL) connection is established between the server and the client.

Thereafter, the server and the client perform a security establishment procedure.

The security establishment procedure may be interpreted as a Secure Simple

Pairing or may be performed with the Secure Simple Pairing.

That is, the security establishment procedure may be performed throughout Phase 1 step to Phase 3 step.

Particularly, a pairing procedure (Phase 1) is performed between the server and the client (step, S8030).

In the pairing procedure, the client transmits a Pairing Request message to the server, and the server transmits a Pairing Response message to the client.

Through the pairing procedure, authentication requirements, I(Input)/O(Output) capabilities, and Key Size are exchanged between devices. Through the information, a type of Key generation method to be used is determined in Phase 2.

Next, in Phase 2, a legacy pairing or a security connection is performed between the server and the client (step, S8040).

In Phase 2, a Temporary Key and a Short Term Key (STK) are generated, which are 128 bits to perform a legacy pairing.

Temporary Key: A key made to generate STK
Short Term Key (STK): A key value used to make an Encrypted connection between devices In the case that the security connection is performed in Phase 2, a Long Term Key (LTK) of 128 bits is generated.

Long Term Key (LTK): A key value used not only in an Encrypted connection between devices but also in a later connection Thereafter, in SSP Phase 3, a Key Distribution procedure is performed between the server and the client (step, S8050).

Through this, the security connection is established between the server and the client, and the Encrypted link is established, and accordingly, a data may be transmitted and received.

FIG. 9 is a flowchart illustrating an example of a transmission power control method to which the present disclosure may be applied.

Referring to FIG. 9, a device in Bluetooth LE may adjust a transmission power by transmitting a Request message of the transmission power.

Particularly, a reception device that receives a signal may update a power adjustment amount field of a LL power control request PDU by considering a) an allowable range of a signal strength to receive a signal and b) two types of factors for a transmission device to reduce a transmission power, which may reduce a power consumption as much as possible.

As such, the reception device may perform a power control procedure for an efficient power control.

First, device A establishes a connection with device B through the BLE, and in the case that a Receiving Signal Strength Indicator (RSSI) identified through a packet received from device B is sufficient to receive a signal, device A may transmit a Request message to request an adjustment of a power level to device B (step, S9010). In this case, the Request message may include transmission power information indicating a transmission power of device A and an adjustment amount value related to a power amount desired to be adjusted.

Device B that performs a role of a control device may adjust a transmission power according to the Request message received from device A and inform an adjusted transmission power to device A through a Response message thereto (step, S9020).

In this case, the Response message may include information related to the fact that a transmission power is adjusted or an indicator indicating an allowance of a power adjustment and transmission power information indicating a transmission power to be changed.

Later, the Link Layers of device A and device B may inform the fact that an event for a change of transmission power is generated to each host through an HCI Local Power Chg Event command (step, S9030).

Alternatively, in the case that device B determines a change of a transmission power to be required, device B may transmit a power control request message including the transmission power information and the adjustment amount value of device B to device A (step, S9040).

In this case, the adjustment amount value may be set to '0', and device B may request whether a transmission power is further reduced without deteriorating a signal reception quality to device A through the power control request message.

In response to this, device A may transmit a response message including an indicator related to an allowance of change, transmission power information related to a transmission power of device A and an adjustment amount value to device B (step, 9050).

Device B may adjust a transmission power according to the response message received from device A and inform an adjusted transmission power to device A through an indicating message (step, S9060).

In this case, the indication message may include information related to the fact that a transmission power is adjusted or an indicator indicating an allowance of a power adjustment and transmission power information indicating a transmission power to be changed.

Later, the Link Layers of device A and device B may inform the fact that an event for a change of transmission power is generated to each host through an HCI Local Power Chg Event command (step, S9070).

A transmission power level in Bluetooth LE may be defined as 4-step as below, and more various levels of power level configuration is available according to an implementation method.

Class 1: +20 dBm
Class 2.5: +10 dBm
Class 3: +4 dBm
Class 4: 0 dBm

FIG. 10 is a diagram illustrating an example of a transmission power method in a multiple connection state to which the present disclosure may be applied.

(a) of FIG. 10 shows a state that a plurality of slave devices is connected to a master device, and in this case, (b) of FIG. 10 shows an example of a case that each of the slave devices requests to adjust a transmission power.

As shown in (a) of FIG. 10, the master device may be connected to a plurality of slave devices and may transmit and receive a data packet through the same transmission power (e.g., Tx Power=10 dBm), respectively.

At this time, the master devices and a plurality of the slave devices may establish ACL (asynchronous connection logical) connections.

In this case, when the master device receives respective change requests from a plurality of the slave devices, a problem may occur in a transmission power control of the master device.

For example, as shown in (b) of FIG. 10, in the state that two slave devices are connected to a single master device, Slave 1 does not have a problem in receiving a data packet since an RSSI is sufficient, and accordingly, Slave 1 may request a decrease of a transmission power. But Slave 2 has a problem in a reception operation of a data packet since an RSSI is weak, Slave 2 may request an increase of a transmission power.

In this case, since the master device may configure only the same transmission power to a plurality of the slave devices, there is a problem that the master device is unable to configure different transmission powers to Slave 1 and Slave 2, respectively.

Accordingly, in this case, the present disclosure proposes a method for a master device to configure a transmission power to a plurality of slave devices.

FIG. 11 is a diagram illustrating an example of a block diagram for a power control method to which the present disclosure may be applied.

Referring to FIG. 11, devices perform a time division transmission in BLE. Accordingly, in the situation described with reference to FIG. 10, in the case that the master device is intended to transmit a data to two slave devices with different transmission levels with each other, a power amplifier needs to change a power differently for each time slot.

Different from the conventional method of transmitting a data with a predetermined level continuously, in order to configured a power level differently for each stream, a time slot (event/sub-event) to which a stream is allocated should be identified, and accordingly, a power amplifier needs to change a power for each corresponding time slot.

For this, a hardware (HW) is additionally required to exchange information between a power amplifier and a Bluetooth stack (logical link—physical channel or the higher profile).

FIG. 12 is a diagram illustrating an example of a power control method to which the present disclosure may be applied.

(a) of FIG. 12 shown an example of a method for a master device to adjust a transmission power according to a power level requested for each slave device, and (b) of FIG. 12 shows an example of a method for adjusting a transmission power according to a transmission level among the requested power levels.

Particularly, as described with reference to FIG. 10, in the case that the master device, which is a control device, is requested to adjust different transmission powers from a plurality of slave devices which is connected, the master device may configure different transmission powers to the slave devices in accordance with the request of each of the slave devices.

For example, as shown in (a) of FIG. 10, in the case that the master device is requested to adjust a transmission power to 4 dBm, 20 dBm and 10 dBM from S1, S2 and S3, respectively, which are the slave devices, the master device may adjust transmission powers of S1, S2 and S3 to 4 dBm, 20 dBm and 10 dBM, respectively, and inform these to S1, S2 and S3.

For such a method, the master device requires a hardware communication circuit between an amplifier to adjust a power level and a Bluetooth stack and needs to readjust transmission intervals of packets allocated to S1 and S2, respectively, considering a power switching time.

The readjusted interval enables a power switching not to occur between packets.

As another method, as described with reference to FIG. 10, in the case that the master device, which is a control device, is requested to adjust different transmission powers from a plurality of slave devices which is connected, the master device may adjust a transmission power to a transmission power among the requested transmission powers and inform the adjusted transmission power to S1, S2 and S3 with the reason of the adjustment.

For example, the master device may adjust a transmission power to a highest level among the transmission power levels requested to adjust from S1, S2 and S3 and inform the adjusted transmission power level to S1, S2 and S3.

In this case, the master device informs S1 and S3, except to S2 that requests to adjust to the highest transmission power level, the reason why a transmission power is adjusted to the transmission power level requested by S2 with the adjusted transmission power level, and accordingly, S1 and S3 do not transmit a request message to request to change of a transmission power level during a predetermined time.

Through the method described above, in the case that the master device is requested to change to different transmission power levels from the respective plurality of slave devices, the master device may adjust a transmission power level.

FIGS. 13 and 14 are diagrams illustrating an example of a differential control method of a power for each logical link according to an embodiment of the present disclosure.

Referring to FIG. 13 and FIG. 14, a control device may configure (or change) a power level (or transmission power) of a plurality of slave devices differently for each link, stream and/or sub-event according to each of a plurality of the slave devices.

FIG. 13 shows a transmission switching time in the case that a data packet is transmitted to different slave devices in an Isochronous stream based on a connection and an Isochronous stream for broadcasting through different transmission levels.

That is, in order for the master device to transmit a packet to the slave devices of which transmission power levels are different, a transmission power needs to be changed for each sub-event as shown in FIG. 13, and in this case, latency occurs as much as the power switching time for changing a transmission power.

In this case, as shown in (a) of FIG. 14, in the case that respective packets are alternately transmitted to S1 and S2, a power switching time for changing a power level occurs frequently, and much latency occurs for a packet transmission. Therefore, in order to minimize the latency, as shown in (b) of FIG. 14, after transmitting a predetermined number of data packets of S1, the master device may transmit a data packet of S2.

In this case, while a predetermined number of data packets of S1 and S2 are alternately transmitted, data packets of S1 and S2 are configured to be continuously transmitted such that each user is unable to recognize a stop of an audio or a service.

That is, even in the case that three data packets of S1 are transmitted, and then, three data packets of S2 are transmitted, and the users of S1 and S2 are unable to recognize a stop of a service, the master device may transmit three data packets of S1, and then, may change a power level and transmit three data packets of S2.

In the case of using such a method, a power level may be configured in accordance with a request of each of the slave devices, and there is an effect of minimizing a power switching time that may occur accordingly.

FIG. 15 is a diagram illustrating an example of a message format for a power control according to an embodiment of the present disclosure.

For a communication between a host and a controller, an HCI command needs to be configured, and (a) of FIG. 15 shown an example of a command to adjust a transmission power.

Through the command shown in (a) of FIG. 15, the host may command to transmit a readout message to obtain a power level state, minimum and maximum transmission powers of a server to the controller.

In the case that a master device is intended to perform an operation to configure a power level differently for each link/connection, information needs to be exchanged between an RF and the host, which is related to the number of slaves to communicate, the number of channels/streams to transmit and a slave to which a data transmitted on each event.

(b) of FIG. 15 shows each parameter and event to exchange the information.

FIG. 16 is a flowchart illustrating an example of a power control method of a control device according to an embodiment of the present disclosure.

Referring to FIG. 16, in the case that a master device, which is a control device, is requested to change a transmission power to different transmission levels with each other from a plurality of slave devices which is connected, the master device may change a transmission power to a highest level.

Particularly, the master device may establish a connection with a plurality of adjacent slave devices (a first device and a second device) through BLE.

Later, in the case that an RSSI of a plurality of the slave devices to receive a data packet from the master device is enough or deficient, each of the slave devices may transmit a request message to the master device (step, S16010).

In this case, the request message may include an adjustment amount value that indicates a transmission power and a changed value of the transmission power of each of the slave devices.

Based on the request message transmitted from each of a plurality of the slave devices, the master device determines whether adjustment amount values to adjust requested by respective the slave devices are the same.

In the case that a part or the whole of the adjustment amount values are different, the master device may determine a single value (e.g., a greatest value) among the requested adjustment amount values to a value to adjust a transmission power (step, S16020).

Later, the master device determines whether the transmission power adjusted by the determined adjustment amount value is the same as a current transmission power.

In the case that the transmission power adjusted by the adjustment amount value is different from the current transmission power, the master device may change a value of the transmission power according to the requested transmission amount (step, S16030) and may transmit an indicator or parameter to allow an adjustment of a transmission power and a response message including a power level of the changed transmission power or a value of power to the respective slave devices (step, S16040).

In this case, the slave devices except the slave device that request the greatest adjustment amount value determine the transmission power transmitted from the master device to be an error value or a wrong response since a transmission power is not adjusted according to their own requested values, and may transmit a request message to request an adjustment of a transmission power again.

Accordingly, in order to prevent a request of an adjustment of a transmission power continually by the slave devices even in the case that a transmission power is adjusted, the master device may further include reason information indicating the reason why a transmission power is changed according to the greatest adjustment amount value in the response message transmitted to the slave devices except the slave devices that request the greatest adjustment amount value.

In the case that the transmission power adjusted according to the adjustment amount is the same as the current transmission power (e.g., in the case that the adjustment amount value is '0'), the master device may transmit a response message including an existing transmission power value and an indicator that allows an adjustment of a transmission power to each of the slave devices (step, S16040).

Through such a method, in the case that the master device is requested to change a transmission power from a plurality of slave devices, the master device may adjust a transmission power to a single value.

FIG. 17 is a flowchart illustrating an example of a power control method of a device according to an embodiment of the present disclosure.

Referring to FIG. 17, device C, which is a master device, may establish a connection with device A and device B through the method described with reference to FIG. 8.

The master device may transmit a data packet to device B and device A with a transmission power of 10 dBm. In this case, in the case that device A has enough transmission power to receive a data packet transmitted from device C and is able to receive a data packet even in the case of decreasing a transmission power, the device A may transmit a request message to request a decrease of a transmission power to device C (step, S17010).

In this case, the request message may include a transmission power of device A and an adjustment amount value (−x) indicating a power amount (increase or decrease) to adjust.

Later, device C adjusts a power level (or transmission power) according to the request message and transmits a response message including an indicator indicating an allowance of a power adjustment and an adjusted power level to device A (step, S17020).

However, in the case that device B does not have enough transmission power to receive a packet transmitted from device C, device B may transmit a request message to request an increase of a transmission power to device C (step, S17030).

In this case, the request message may include a transmission power of device A and an adjustment amount value (x) indicating a power amount (increase or decrease) to adjust.

Later, device C adjusts a power level (or transmission power) according to the request message and transmits a response message including an indicator indicating an allowance of a power adjustment and an adjusted power level to device B (step, S17040).

Thereafter, device C may transmit a data packet with a decreased transmission power (e.g., 4 dBm) to device A and transmit a data packet with an increased transmission power (e.g., 20 dBm) to device B.

That is, as described with reference to FIG. 13 and FIG. 14, device C may configure transmission powers of device A and device B differently according to a link, a stream and/or sub-event of each of the slave devices.

In this case, in order to transmit a data packet to device A and device B through different transmission powers, device C may transmit a data packet to each of device A and device B through the method described with reference to FIG. 14.

Through the method, the master device may configure different transmission powers to the slave devices, respectively.

FIG. 18 is a flowchart illustrating another example of a power control method of a device according to an embodiment of the present disclosure.

Referring to FIG. 18, a transmission power may be adjusted according to a request of a slave device that request a change to a greatest transmission power.

First, since step S18010 and step S18020 are the same as step S17010 and step S17020, the description is omitted.

Later, in the case that device B does not have enough transmission power to receive a packet transmitted from device C, device B may transmit a request message to request an increase of a transmission power to device C (step, S18030).

In this case, the request message may include a transmission power of device A and an adjustment amount value (x) indicating a power amount (increase or decrease) to adjust.

Later, device C adjusts a power level (or transmission power) according to the request message and transmits a response message including an indicator indicating an allowance of a power adjustment and an adjusted power level to device B (step, S18040).

In this case, the transmission power changed by device C is applied to device A as well as device B. That is, device C does not change a transmission power for each slave device but changes a transmission power so as to be applied to all slave devices.

When device C changes transmission powers of all slave devices, device C, which is a master device, may configure transmission powers of all slave devices in a batch based on the greatest value among the requested change values of transmission power.

Since device C changes a transmission power to a value different from the value requested by device A, device C may transmit an indication message to device A such that device A does not identify the changed transmission power as an error (step, S18050).

In this case, the indication message may include an indicator indicating that a transmission power is not changed according to the request of device A, a device identifier that requests a changed transmission power and duration information related to a duration while a change request of a transmission power is stopped.

Later, device C may transmit a data packet with an increased transmission power (e.g., 20 dBm) to device A and device B.

FIG. 19 is a flowchart illustrating another example of a power control method of a device according to an embodiment of the present disclosure.

First, since step S19010 and step S19050 are the same as step S18010 and step S18050, the description is omitted.

The master device that increases a transmission power according to a request of device B may check an RSSI of device B continually (step, S19060).

That is, the master device may transmit an LL power control ping to device B continually, and device B may check (or monitor) an RSSI of the LL power control ping continually transmitted to device B and/or a path loss in a transmission and reception path.

In the case that the RSSI increases to secure the RSSI enough to perform a reception or the path loss becomes smaller than a predetermined threshold value, device B may transmit a request message to request a decrease of a transmission power to device C (step, S19070).

That is, in the case that the RSSI is enough to receive a data packet transmitted from device C even in the case that device C decreases a transmission power, device B may transmit a message to request an adjustment of a transmission power to device C.

In this case, the request message may include a transmission power of device A and an adjustment amount value (−x) indicating a power amount (increase or decrease) to adjust.

Later, device C adjusts a power level (or transmission power) according to the request message and transmits a response message including an indicator indicating an allowance of a power adjustment and an adjusted power level to device B (step, S19080).

Thereafter, device C may decrease the transmission power which is previously increased to device A and device B and may transmit a data packet with the decreased transmission power (e.g., 10 dBm).

On the other hand, in the case that the RSSI is not enough or the path loss becomes greater than a predetermined threshold value, device B may transmit a request message to request an increase of a transmission power to device C.

Through the method described above, even in the case that the master device increases a transmission power of a data packet transmitted to all slave devices in a batch, the master device may continually check an RSSI of a slave device that requests an increase of a transmission power and may further decrease a transmission power.

Further, although the drawings have been individually described for ease of description, the embodiments shown in the drawings may be merged with each other to implement new embodiments. As necessary by those ordinary skilled in the art, designing recording media readably by a computer recording programs to execute the above-described embodiments also belongs to the scope of the present disclosure.

The direction-based device searching method proposed in the present disclosure, rather than limited to the configurations and methods according to the above-described embodiments, but may be configured so that all or some of the embodiments may be selectively combined with each other to allow for various variations or modifications.

Meanwhile, the direction-based device searching method of the present disclosure may be implemented as codes that are readable by a recording medium readable by a process provided in a network device. The recording media readable by the processor include all types of recording devices for storing data that is readable by the processor. Examples of the recording media readable by the process include ROM, RAM, CD-ROM, a magnetic tape, a floppy disc, an optical data storage device, and the like, and may be further implemented in the form of carrier waves such as transmitted over the Internet. Further, the recording media readable by the processor may be distributed to computer systems connected with each other via a network, and processor readable codes may be stored and executed in a distributing manner.

In addition, the preferred embodiments of the present disclosure have been depicted and described so far, but the present disclosure is not limited to the specific embodiment described above. It is understood that various modifications are available by those skilled in the dart without departing from the technical feature of the present invention claimed in claims, and such modifications should not be individually understood from the technical spirit and prospect of the present disclosure.

Further, both the method invention and the device invention are described in the present disclosure, and both the invention may be applied complementarily with each other as occasion demands.

INDUSTRIAL APPLICABILITY

An example in which the transmitting and receiving data of the present disclosure has been described applied to the Bluetooth LE, but the method may be applied to various wireless communication systems in addition to the Bluetooth LE.

The invention claimed is:

1. A method for controlling a power in a wireless communication system, the method performed by a control device comprising:

establishing a connection with a first device and a second device through Bluetooth Low Energy (BLE);

receiving, from the first device, a first request message for requesting a transmission power change of the first device, wherein the first request message includes a first transmission power value of a transmission power of the first device and a first change value of a transmission power;

receiving, from the second device, a second request message for requesting a transmission power change of the second device, wherein the second request message includes a second transmission power value of a transmission power of the second device and a second change value of a transmission power; and changing a transmission power of the control device to a specific transmission power value based on the first change value and the second change value, wherein the specific transmission power value is a value of a third transmission power value, which is the transmission power of the control device, added by the first change value or the second change value.

2. The method of claim 1, further comprising:
transmitting a response message including the specific transmission power value to the first device and the second device.

3. The method of claim 2, when the specific transmission power value is a value of the third transmission power value added by the first change value, wherein the response message transmitted to the second device includes reason information related to a reason why the specific transmission power value is changed based on the first change value.

4. The method of claim 2, when the specific transmission power value is a value of the third transmission power value added by the second change value, wherein the response message transmitted to the first device includes reason information related to a reason why the specific transmission power value is changed to the value of the third transmission power value added by the second change value.

5. The method of claim 1, wherein the specific transmission power value is changed based on a greater value between the first change value and the second change value.

6. The method of claim 5, further comprising:
identifying a Received Signal Strength Indicator (RSSI) or a Path Loss of the first device or the second device.

7. The method of claim 6, when the RSSI is a threshold value or greater, further comprising:

receiving, from the first device or the second device, a third request message for requesting a decrease of the transmission power of the control device, wherein the third request message includes a third change value related to a decreased transmission power; and transmitting the response message including the decreased third transmission power value to the first device or the second device.

8. The method of claim 1, wherein the specific transmission power value is differently configured for each of a link, a stream or an event for providing a specific service between the first device and the second device.

9. The method of claim 8, wherein a controller and a host of the control device exchange at least one parameter value through a Host Controller Interface (HCI) command to configure the specific transmission power value differently for each of the link, the stream or the event between the first device and the second device.

10. A control device for controlling a power in a wireless communication system, comprising:

a communication unit for communicating with an exterior wirelessly or wirely; and a processor functionally connected to the communication unit, wherein the processor is configured to:

establish a connection with a first device and a second device through Bluetooth Low Energy (BLE);

receive, from the first device, a first request message for requesting a transmission power change of the first device, wherein the first request message includes a first transmission power value of a transmission power of the first device and a first change value of a transmission power;

receive, from the second device, a second request message for requesting a transmission power change of the second device, wherein the second request message includes a second transmission power value of a transmission power of the second device and a second change value of a transmission power; and change a transmission power of the control device to a specific transmission power value based on the first change value and the second change value, wherein the specific transmission power value is a value of a third transmission power value, which is the transmission power of the control device, added by the first change value or the second change value.

* * * * *